US012355168B2

(12) United States Patent
Xie et al.

(10) Patent No.: US 12,355,168 B2
(45) Date of Patent: Jul. 8, 2025

(54) ELECTRICAL CONNECTION APPARATUS, MANUFACTURING METHOD, AND COMPUTER DEVICE

(71) Applicant: Huawei Technologies Co., Ltd., Shenzhen (CN)

(72) Inventors: Junqing Xie, Dongguan (CN); Yunpeng Deng, Nanjing (CN); Liang Zhang, Beijing (CN); Heniu Wang, Beijing (CN); Hongcheng Cui, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 330 days.

(21) Appl. No.: 17/821,655

(22) Filed: Aug. 23, 2022

(65) Prior Publication Data

US 2023/0139617 A1 May 4, 2023

(30) Foreign Application Priority Data

Aug. 24, 2021 (CN) ........................ 202110977533.5

(51) Int. Cl.

| | |
|---|---|
| ***H01R 12/57*** | (2011.01) |
| ***H01R 9/05*** | (2006.01) |
| ***H01R 13/40*** | (2006.01) |
| ***H01R 13/502*** | (2006.01) |
| ***H01R 13/52*** | (2006.01) |
| ***H01R 43/16*** | (2006.01) |

(52) U.S. Cl.

CPC ............. *H01R 12/57* (2013.01); *H01R 13/40* (2013.01); *H01R 13/502* (2013.01); *H01R 13/5213* (2013.01); *H01R 43/16* (2013.01); *H01R 9/05* (2013.01); *H01R 2201/06* (2013.01)

(58) Field of Classification Search

CPC .................................................... H01R 12/716

See application file for complete search history.

(56) References Cited

U.S. PATENT DOCUMENTS 3,836,826 A 9/1974 Hotchkiss et al.
4,640,562 A * 2/1987 Shoemaker ............ H01R 12/79 439/495

(Continued)

FOREIGN PATENT DOCUMENTS

CN 109891676 A 6/2019
CN 111600155 A 8/2020

(Continued)

*Primary Examiner* — Oscar C Jimenez
(74) *Attorney, Agent, or Firm* — SLATER MATSIL, LLP

(57) ABSTRACT

An electrical connection apparatus includes a cable connector, a PCB, and a fastened wall. The cable connector includes a connecting terminal and a plurality of first contacts. One part of each first contact is located in the connecting terminal, and the other part extends from the connecting terminal. The printed circuit board includes a substrate and a plurality of second contacts. The plurality of second contacts are located on a surface of the substrate. The fastened wall includes a plurality of sidewalls. The plurality of sidewalls are fastened to the substrate, and are located on at least two opposite sides of the plurality of second contacts. When the cable connector and the PCB are fitted, the cable connector and the fastened wall are detachably fastened, and the first contact and the second contact are in close contact.

20 Claims, 10 Drawing Sheets

(56) References Cited

U.S. PATENT DOCUMENTS

| | | | | |
|---|---|---|---|---|
| 4,820,179 | A * | 4/1989 | Saijo | H01R 4/2466 439/942 |
| 5,842,873 | A | 12/1998 | Gonzales | |
| 9,730,351 | B2 * | 8/2017 | Hsu | H05K 7/1092 |
| 2006/0228952 | A1 | 10/2006 | Feldman et al. | |
| 2008/0045076 | A1 | 2/2008 | Dittmann et al. | |
| 2008/0233797 | A1 * | 9/2008 | Hsu | H01R 13/6582 439/69 |
| 2021/0376507 | A1 * | 12/2021 | Guo | H01R 13/629 |
| 2024/0030633 | A1 * | 1/2024 | Sato | H01R 12/79 |
| 2024/0047911 | A1 * | 2/2024 | Morgan | H01R 13/6592 |
| 2024/0063585 | A1 * | 2/2024 | Shah | H01R 12/716 |
| 2024/0128669 | A1 * | 4/2024 | Lim | H01R 12/75 |

FOREIGN PATENT DOCUMENTS

| | | | |
|---|---|---|---|
| CN | 112928550 | A | 6/2021 |
| CN | 113224597 | A | 8/2021 |
| DE | 102020100856 | A1 | 7/2021 |
| JP | 2006067443 | A | 3/2006 |
| KR | 20160002143 | A | 1/2016 |

* cited by examiner

ELECTRICAL CONNECTION APPARATUS, MANUFACTURING METHOD, AND COMPUTER DEVICE

CROSS-REFERENCE TO RELATED APPLICATIONS

This application claims priority to Chinese Patent Application No. 202110977533.5, filed on Aug. 24, 2021, which is hereby incorporated by reference in its entirety.

TECHNICAL FIELD

This application relates to the field of electrical connection technologies, and in particular, to an electrical connection apparatus, a manufacturing method, and a computer device.

BACKGROUND

An electrical connection apparatus is an apparatus for electrically connecting two components. For example, an optical cage connector and a chip may be electrically connected by using the electrical connection apparatus. For another example, two chips may be electrically connected by using the electrical connection apparatus.

The electrical connection apparatus mainly includes a cable connector and a printed circuit board (PCB) in structure. The cable connector mainly includes a connecting terminal, a plurality of spring plates, and a plurality of cables. One part of each spring plate is located in the connecting terminal, and the other part extends from a bottom of the connecting terminal. One end of each cable extends into the connecting terminal, and is electrically connected to the spring plate. There are a plurality of contacts on a board surface of the printed circuit board. In this way, when the cable connector is assembled on the printed circuit board, the spring plate in the cable connector is abutted against the contact on the printed circuit board, to electrically connect the cable connector and the printed circuit board.

In application, the cable in the cable connector may be electrically connected to the optical cage connector, and the contact on the printed circuit board may be electrically connected to the chip mounted on the printed circuit board, to electrically connect the optical cage connector and the chip by using the electrical connection apparatus.

There is a contact electrical connection between the cable connector and the printed circuit board. Therefore, to ensure stability of the electrical connection between the cable connector and the printed circuit board, a fastener that can be used to tightly press the connecting terminal onto the printed circuit board is usually required. Currently, in most cases, a buckle (the buckle may also be referred to as a socket) is used as a fastener. Therefore, the electrical connection apparatus further includes a buckle. The buckle usually includes two parts: a first part and a second part. The first part and the second part are hinged, and the first part and the printed circuit board are fastened. When the cable connector is located on the printed circuit board, the second part of the buckle is pressed onto the cable connector, and is snap-fitted on the first part. In this way, the cable connector is tightly pressed onto the printed circuit board under the action of the buckle, so that the spring plate in the cable connector and the contact on the printed circuit board are in close contact.

When the cable connector is assembled on the printed circuit board, and when the cable connector is removed from the printed circuit board, the buckle needs to be opened, so that the second part of the buckle is lifted relative to the first part. It may be learned that sufficient space needs to be reserved around the buckle on the printed circuit board, to lift the second part of the buckle. Consequently, the buckle used to tightly press the cable connector onto the printed circuit board occupies relatively large space on the printed circuit board.

SUMMARY

This application provides an electrical connection apparatus, a manufacturing method, and a computer device, to resolve a problem, in a related technology, that a buckle used to tightly press a cable connector onto a printed circuit board occupies relatively large space on the printed circuit board. The technical solutions are as follows.

According to an aspect, an electrical connection apparatus is provided. The electrical connection apparatus includes a cable connector, a printed circuit board, and a fastened wall. The cable connector includes a connecting terminal and a plurality of first contacts. One part of each first contact is located in the connecting terminal, and the other part extends from the connecting terminal. The printed circuit board includes a substrate and a plurality of second contacts. The plurality of second contacts are located on a surface of the substrate. The fastened wall includes a plurality of sidewalls. The plurality of sidewalls are fastened to the substrate, and are located on at least two opposite sides of the plurality of second contacts. When the cable connector and the printed circuit board are fitted, the cable connector and the fastened wall are detachably fastened, and the first contact and the second contact are in close contact.

The cable connector and the fastened wall may be detachably fastened through snap-fitting, and snap-fitting of the cable connector and the fastened wall may be snap-fitting of the connecting terminal and the fastened wall or snap-fitting of a shielding can in the cable connector and the fastened wall.

In the solution shown in this application, the fastened wall used to tightly press the connecting terminal in the cable connector onto the printed circuit board includes the plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in a detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

In a possible implementation, the plurality of sidewalls surround the plurality of second contacts, and the connecting terminal is located in annular space enclosed by the plurality of sidewalls.

In the solution shown in this application, the plurality of sidewalls may be divided into two parts. Some sidewalls are located on a first side of the second contacts, and the other sidewalls are located on a second side of the second contacts. The first side and the second side are opposite to each other. Alternatively, the plurality of sidewalls may be divided into three parts. Some sidewalls are located on a first side of the second contacts, some sidewalls are located on a second side of the second contacts, and the remaining sidewalls are located on a third side of the second contacts. The first side and the second side are opposite to each other, and the third side and the first side are adjacent to each other. Alternatively, the plurality of sidewalls may be divided into four parts. Some sidewalls are located on a first side of the second contacts, some sidewalls are located on a second side of the second contacts, some sidewalls are located on a third side of the second contacts, and the remaining sidewalls are located on a fourth side of the second contacts. The first side and the second side are opposite to each other, the third side and the first side are adjacent to each other, and the fourth side and the third side are opposite to each other.

In a possible implementation, the plurality of sidewalls are head-to-tail connected to form the annular space.

In a possible implementation, the fastened wall further includes a plurality of elastic plates, each elastic plate is connected to the sidewall, and the elastic plate can rotate around a connection point relative to the connected sidewall; and the elastic plate is configured to enable the connecting terminal and the fastened wall to be snap-fitted.

In the solution shown in this application, the connecting terminal and the fastened wall may be snap-fitted by fitting a positioning protrusion and a positioning hole of the elastic plate, or the connecting terminal and the fastened wall may be snap-fitted by pressing the connecting terminal into the fastened wall by using the elastic plate. The connecting terminal and the fastened wall are snap-fitted, to facilitate automatic assembly of the connecting terminal and the fastened wall. In this way, assembly efficiency can be improved, and screw-free assembly can be implemented.

In a possible implementation, a first end of the elastic plate in a height direction is connected to the sidewall, and a second end is far away from the sidewall; and each elastic plate is provided with a first positioning hole, there are a plurality of first positioning protrusions on a side surface of the connecting terminal, and the first positioning protrusion is located in the first positioning hole.

In the solution shown in this application, in the manner of fitting the positioning protrusion and the positioning hole of the elastic plate, when the connecting terminal is moved downward from the direction directly above the fastened wall to a direction close to the fastened wall, if the connecting terminal continues to be moved downward when being in contact with the second end that is of the elastic plate and that is far away from the connected sidewall during downward movement, the elastic plate is extended out of a frame of the fastened wall, to continue to perform downward movement. When the first positioning protrusion of the connecting terminal is located in the first positioning hole on the fastened wall during downward movement, downward movement may be stopped. In this case, the connecting terminal is stably snap-fitted into the fastened wall. When the first positioning protrusion of the connecting terminal is located in the first positioning hole on the fastened wall during downward movement of the connecting terminal, the connecting terminal may continue to be moved downward to a limit position. After external force exerted for controlling the connecting terminal to move downward is removed, the connecting terminal moves upward under elastic force of the first contact. When the first positioning protrusion is in contact with an upper edge of the first positioning hole during upward movement, the connecting terminal is stably snap-fitted into the fastened wall.

In a possible implementation, the second end that is of each elastic plate and that is far away from the connected sidewall is bent out of the frame of the fastened wall.

In the solution shown in this application, in the foregoing structure of the elastic plate, during downward movement of the connecting terminal, the first positioning protrusion can gradually extend the elastic plate out of the frame of the fastened wall, and the connecting terminal is smoothly moved downward to the fastened wall.

In a possible implementation, an end face that is of each first positioning protrusion and that is far away from the side surface on which the first positioning protrusion is located includes an inclined surface, an intersection line between a plane on which the inclined surface is located and the side surface is located below the first positioning protrusion, and there is the direction close to the printed circuit board below the first positioning protrusion.

In the solution shown in this application, in the foregoing structure of the first positioning protrusion, during downward movement of the connecting terminal, the first positioning protrusion can gradually extend the elastic plate out of the frame of the fastened wall, and the connecting terminal is smoothly moved downward to the fastened wall.

In a possible implementation, each elastic plate includes a parent body and a folding body formed through folding, and the parent body is connected to the sidewall; and the folding body of each elastic plate is located on an upper surface that is of the connecting terminal and that is far away from the substrate.

In the solution shown in this application, during downward movement of the connecting terminal from the direction directly above the fastened wall to the direction close to the fastened wall, when the connecting terminal is in contact with the elastic plate, the elastic plate can be extended out of the frame of the fastened wall, so that the connecting terminal continues to move downward. When the folding body of the elastic plate is located on the upper surface of the connecting terminal during downward movement, the connecting terminal is snap-fitted into the fastened wall.

In a possible implementation, there are a plurality of first positioning rods at a bottom of the connecting terminal, there are a plurality of first positioning holes on the substrate, and the first positioning rod is located in the first positioning hole.

In the solution shown in this application, during downward movement of the connecting terminal from the direction directly above the fastened wall to the direction close to the fastened wall, the first positioning rod first enters the first positioning hole. In this way, precision of aligning the connecting terminal and the printed circuit board can be improved, and efficiency of assembly between the cable connector and the printed circuit board can be improved.

In a possible implementation, the cable connector further includes a shielding can, and the shielding can is located on a surface that is of the connecting terminal and that is far away from the substrate, and is snap-fitted with the fastened wall.

In the solution shown in this application, the shielding can be used to reduce interference caused by a signal of a surrounding component to a signal transmitted in the electrical connection apparatus, and may be further used to reduce interference caused by the signal transmitted in the electrical connection apparatus to a signal of another component.

In addition, when the shielding can and the fastened wall are snap-fitted, the connecting terminal can be tightly pressed onto the printed circuit board. For example, there may be no snap-fitting relationship between the connecting terminal and the fastened wall, and the connecting terminal can still be tightly pressed onto the printed circuit board when the shielding can and the fastened wall are snap-fitted. For another example, there is a snap-fitting relationship between the connecting terminal and the fastened wall, and there is a snap-fitting relationship between the shielding can and the fastened wall, so that the connecting terminal can be firmly pressed onto the printed circuit board.

In a possible implementation, the shielding can is provided with a second positioning hole, there is a second positioning protrusion on the sidewall, and the second positioning protrusion is located in the second positioning hole.

In the solution shown in this application, the shielding can and the fastened wall may be snap-fitted by using a fitting relationship between the positioning protrusion and the positioning hole.

In a possible implementation, the shielding can and the connecting terminal are fastened.

In the solution shown in this application, in a solution in which there is no snap-fitting relationship between the connecting terminal and the fastened wall, there is a fastening relationship between the shielding can and the connecting terminal. In this case, during assembly of the cable connector and the printed circuit board, the connecting terminal does not need to be pressed into the fastened wall, and the connecting terminal to which the shielding can is fastened is directly moved downward to the fastened wall, to tightly press the connecting terminal onto the printed circuit board by snap-fitting the shielding can and the fastened wall. This facilitates automatic assembly of the cable connector and the printed circuit board.

In a solution in which there is a snap-fitting relationship between the connecting terminal and the fastened wall, the connecting terminal and the fastened wall are snap-fitted, and the shielding can and the fastened wall are snap-fitted, so that the connecting terminal can be firmly pressed onto the printed circuit board.

In a possible implementation, the electrical connection apparatus further includes a dustproof cover; and when the cable connector and the printed circuit board are not fitted, the dustproof cover covers the plurality of second contacts in a direction far away from the substrate.

In the solution shown in this application, when the cable connector and the printed circuit board do not need to be electrically connected, the cable connector and the printed circuit board do not need to be fitted, and the dustproof cover may cover the plurality of second contacts in the direction far away from the substrate, to reduce dust accumulation on the second contacts and keep the second contacts clean.

In a possible implementation, there is a clamping groove on a side part of the dustproof cover, the clamping groove and the sidewall are clamped, and there is a gap between the dustproof cover and the second contact.

In the solution shown in this application, the clamping groove of the dustproof cover and the sidewall of the fastened wall are clamped. In this way, the dustproof cover and the fastened wall can be detachably fastened. In addition, there can be a gap between the dustproof cover and the second contact, and the dustproof cover and the second contact are not in contact with each other, to prevent the dustproof cover from wearing the second contact and protect the second contact.

According to another aspect, a method for manufacturing an electrical connection apparatus is provided, and includes: fastening a plurality of first contacts to a connecting terminal, where one part of each first contact extends from the connecting terminal, to obtain a cable connector; fastening a plurality of second contacts to a surface of a substrate, to obtain a printed circuit board; fastening a plurality of sidewalls of a fastened wall to the substrate, where the plurality of sidewalls are located on at least two opposite sides of the plurality of second contacts; and when the cable connector and the printed circuit board are fitted, fastening the cable connector and the fastened wall in a detachable manner, where the first contact and the second contact are in close contact.

In the solution shown in this application, the fastened wall of the processed electrical connection apparatus is used to tightly press the connecting terminal in the cable connector onto the printed circuit board, includes the plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in the detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

In a possible implementation, the method for manufacturing an electrical connection apparatus is applied to the foregoing electrical connection apparatus.

In a possible implementation, the method further includes: connecting each of a plurality of elastic plates to the sidewall.

The elastic plate can rotate around a connection point relative to the connected sidewall, and is configured to enable the connecting terminal and the fastened wall to be snap-fitted.

In the solution shown in this application, the elastic plate and the sidewall may be integrally formed to implement connection. For example, a plurality of strip-shaped slits are disposed on the sidewall in a height direction, and the elastic plate is formed two adjacent strip-shaped slits. Alternatively, the elastic plate may be connected to the sidewall through welding.

In a possible implementation, the connecting each of a plurality of elastic plates to the sidewall includes: connecting a first end of each of the plurality of elastic plates in the height direction to the sidewall, where a second end of each elastic plate is far away from the sidewall, where each elastic plate is provided with a first positioning hole, and there are a plurality of first positioning protrusions on a side surface of the connecting terminal; and the fastening the cable connector and the fastened wall in a detachable manner includes: mounting the first positioning protrusion in the first positioning hole.

In the solution shown in this application, the connecting terminal may be snap-fitted into the fastened wall by fitting the positioning protrusion and the positioning hole of the elastic plate. In this manner of implementing snap-fitting by fitting the positioning protrusion and the positioning hole, it is relatively convenient to assemble the connecting terminal on the printed circuit board and detach the connecting terminal from the printed circuit board, and efficiency of assembly and detachment between the cable connector and the printed circuit board may be improved.

In a possible implementation, each elastic plate includes a parent body and a folding body formed through folding; the connecting each of a plurality of elastic plates to the sidewall includes: connecting the parent body of each elastic plate to the sidewall; and the fastening the cable connector and the fastened wall in a detachable manner includes: pressing the folding body of each elastic plate onto an upper surface that is of the connecting terminal and that is far away from the substrate.

In the solution shown in this application, the connecting terminal and the fastened wall may be snap-fitted by pressing the elastic plate onto the upper surface that is of the connecting terminal and that is far away from the substrate. In this snap-fitting manner, it is relatively convenient to mount the cable connector on the printed circuit board, and efficiency of assembly between the cable connector and the printed circuit board may be improved.

In a possible implementation, the cable connector further includes a shielding can, and the method further includes: covering a surface that is of the connecting terminal and that is far away from the substrate with the shielding can, and snap-fitting the shielding can and the fastened wall.

In the solution shown in this application, a process of covering the connecting terminal with the shielding can may be performed before the connecting terminal is mounted into the fastened wall or after the connecting terminal is mounted into the fastened wall. The shielding can reduce interference caused by a surrounding component to a signal transmitted in the electrical connection apparatus, and may further reduce interference caused by the signal transmitted in the electrical connection apparatus to another component.

In a possible implementation, the electrical connection apparatus further includes a dustproof cover, and the method further includes: when the cable connector and the printed circuit board are not fitted, covering the plurality of second contacts with the dustproof cover in a direction far away from the substrate.

In the solution shown in this application, when the cable connector and the printed circuit board do not need to be electrically connected, in other words, when the cable connector and the printed circuit board are not fitted, the dustproof cover covers the plurality of second contacts in the direction far away from the substrate, to reduce dust accumulation on the second contacts and keep the second contacts clean.

In a possible implementation, there is a clamping groove on a side part of the dustproof cover; and the covering the plurality of second contacts with the dustproof cover in a direction far away from the substrate, includes: placing the dustproof cover above the plurality of second contacts in the direction far away from the substrate, and clamping the clamping groove on the sidewall, where there is a gap between the dustproof cover and the second contact.

In the solution shown in this application, the clamping groove of the dustproof cover and the sidewall of the fastened wall are clamped. In this way, the dustproof cover and the fastened wall can be detachably fastened. In addition, there can be a gap between the dustproof cover and the second contact, and the dustproof cover and the second contact are not in contact with each other, to prevent the dustproof cover from wearing the second contact and protect the second contact.

According to another aspect, a computer device is provided. The computer device includes the foregoing electrical connection apparatus.

In the solution shown in this application, a fastened wall of the electrical connection apparatus included in the computer device is used to tightly press a connecting terminal in a cable connector onto a printed circuit board, includes a plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in a detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

REFERENCE NUMERALS

1: Cable connector; 11: Connecting terminal; 12: First contact; 13: Cable; and 14: Shielding can; and

11*a*: Side surface; 111: First positioning protrusion; 111*a*: Inclined surface; 112: First positioning rod; and 141: Second positioning hole.

2: Printed circuit board; 21: Substrate; 22: Second contact; 211: First positioning hole; and 212: Second positioning hole.

3: Fastened wall; 31: Sidewall; 32: Elastic plate; 311: Second positioning protrusion; 312. Second positioning rod; 313: Opening; 321: First positioning hole; 322: Parent body; and 323: Folding body.

4: Dustproof cover; 41: Clamping groove; 42: Handle structure; and 43: Third positioning rod.

DETAILED DESCRIPTION OF ILLUSTRATIVE EMBODIMENTS

An embodiment of this application provides an electrical connection apparatus. The electrical connection apparatus is mainly configured to electrically connect two components, for example, may electrically connect an optical cage connector and a chip, and may further electrically connect two chips. Specific application of the electrical connection apparatus is not limited in this embodiment, and the electrical connection apparatus may be applied to an electrical connection between two components in any field. The electrical connection may be used for signal transmission or electric power transmission. To clearly describe an application scenario of the electrical connection apparatus, a main structure of the electrical connection apparatus may be first described.

Figure 1:
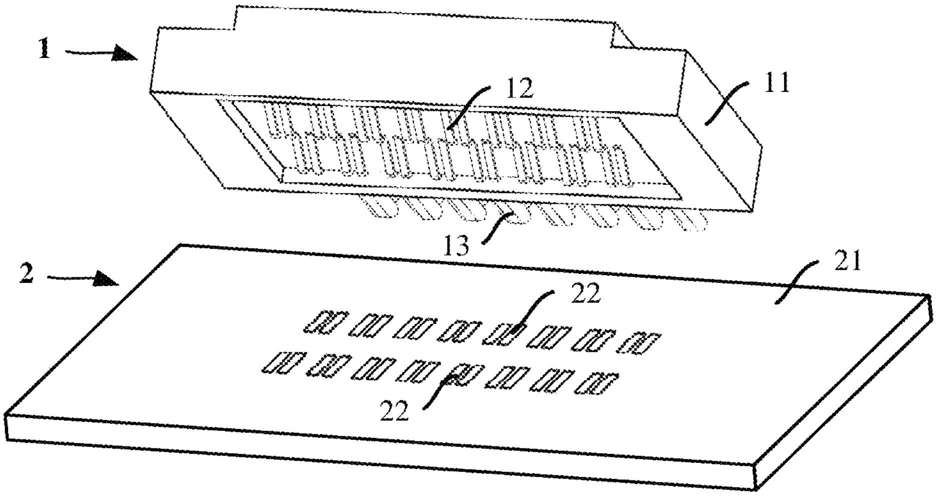
FIG. 1 (PRIOR ART)
FIG. 1 is a schematic diagram of an explosive structure of an electrical connection apparatus according to this application.

FIG. 1 is a schematic diagram of an explosive structure of the electrical connection apparatus. It may be learned from FIG. 1 that the electrical connection apparatus mainly includes a cable connector 1 and a printed circuit board 2. The cable connector 1 may include a connecting terminal 11, first contacts 12, and cables 13. There are a plurality of first contacts 12 and a plurality of cables 13. The first contact 12 is electrically connected to the cable 13. The printed circuit board 2 includes a substrate 21 and second contacts 22. There are a plurality of second contacts 22 laid on a surface of the substrate 21. As shown in FIG. 1, when the cable connector 1 is located on a surface of the printed circuit board 2, the first contact 12 is in contact with the second contact 22, so that the cable connector 1 is electrically connected to the printed circuit board 2.

During application of the electrical connection apparatus, in a case, the electrical connection apparatus may be configured to electrically connect two different components, for example, electrically connect an optical cage connector and a chip. An end that is of the cable 13 and that is far away from the connecting terminal 11 may be electrically connected to a connector in the optical cage connector, and the chip may be electrically connected to the second contact 22 on the printed circuit board 2. In this way, the optical cage connector may be electrically connected to the chip by using the electrical connection apparatus. The cable connector 1, the optical cage connector, and the chip may be mounted on a substrate of a same printed circuit board, or may be mounted on substrates of different printed circuit boards.

During application of the electrical connection apparatus, in another case, the electrical connection apparatus may be configured to electrically connect two same components, for example, electrically connect two chips. The two chips may be electrically connected by using two electrical connection apparatuses, which may be denoted as a first electrical connection apparatus and a second electrical connection apparatus. A cable 13 of the first electrical connection apparatus is electrically connected to a cable 13 of the second electrical connection apparatus. A second contact 22 of a printed circuit board 2 of the first electrical connection apparatus is electrically connected to one of the chips, and a second contact 22 of a printed circuit board 2 of the second electrical connection apparatus is electrically connected to the other chip. In this way, the two chips may be electrically connected by using the two electrical connection apparatuses. The first electrical connection apparatus and the second electrical connection apparatus may include a same cable 13, that is, one end of the cable 13 is fastened in a connecting terminal 11 of the first electrical connection apparatus, and the other end of the cable 13 is fastened in a connecting terminal 11 of the second electrical connection apparatus. The first electrical connection apparatus and the second electrical connection apparatus may include a same printed circuit board 2, or may certainly include different printed circuit boards 2.

A manner in which two components are electrically connected by using the electrical connection apparatus achieves a faster transmission speed and less loss than a manner in which two components are electrically connected by using a flat cable on a printed circuit board.

The foregoing describes the application scenario of the electrical connection apparatus, and the following describes a structure of the electrical connection apparatus in detail.

As described above, when the cable connector 1 of the electrical connection apparatus is assembled on the printed circuit board 2, the first contact 12 of the cable connector 1 is in contact with the second contact 22 of the printed circuit board 2, so that the cable connector 1 is electrically connected to the printed circuit board 2.

At least one of the first contact 12 and the second contact 22 may be elastic. For example, the first contact 12 is elastic, and may be specifically a conductive spring plate, a conductive elastomer, or the like. The second contact 22 is a conductive plate. For another example, the first contact 12 is a conductive plate. The second contact 22 is elastic, and may be specifically a conductive spring plate or a conductive elastomer. For another example, both the first contact 12 and the second contact 22 are elastic, and may be specifically conductive spring plates. Certainly, both the first contact 12 and the second contact 22 may be conductive plates.

Specific structures and shapes of the first contact 12 and the second contact 22 are not limited in this embodiment, and may be flexibly selected based on an actual situation. For ease of description, the figure in this embodiment uses an example in which the first contact 12 is a conductive spring plate and the second contact 22 is a conductive plate.

It may be learned that the electrical connection apparatus implements an electrical connection through flexible contact. Therefore, the electrical connection apparatus may also be referred to as a flexible electrical connection apparatus or a contact electrical connection apparatus.

As described above, the electrical connection apparatus includes the cable connector 1. The cable connector 1 includes the cable 13, and therefore the cable connector 1 may also be referred to as a cable connector. As described above, the cable connector 1 includes not only the plurality of cables 13, but also the connecting terminal 11 and the plurality of first contacts 12.

The connecting terminal 11 is a main structure of the cable connector 1. Each first contact 12 may also be referred to as a conductive pin.

As shown in FIG. 1, one part of the first contact 12 is fixedly located in the connecting terminal 11, and the other part extends from the connecting terminal 11. For example, the plurality of first contacts 12 extend from a bottom of the connecting terminal 11. The bottom of the connecting terminal 11 may be a position that is in contact with the printed circuit board 2. The plurality of first contacts 12 may be arranged in an array at the bottom of the connecting terminal 11. For example, as shown in FIG. 1, the plurality of first contacts 12 may be arranged in two rows at the bottom of the connecting terminal 11.

Further referring to FIG. 1, one end of each of the plurality of cables 13 is inserted into the connecting terminal 11 and electrically connected to the first contact 12. One end of each cable 13 may be welded to the connecting terminal 11 and electrically connected to the first contact 12 in the connecting terminal 11.

Based on the foregoing description, a structure of the cable connector 1 in the electrical connection apparatus may be as follows: The cable connector 1 includes the connecting terminal 11, the plurality of first contacts 12, and the plurality of cables 13. One part of each first contact 12 is fastened in the connecting terminal 11, and the other part extends from the bottom of the connecting terminal 11, and is configured to be electrically connected to the printed circuit board 2. One end of each cable 13 is inserted into the connecting terminal 11 and electrically connected to the first contact 12.

As described above, the electrical connection apparatus further includes the printed circuit board 2. The printed circuit board 2 may be a mainboard of a communications device in which the electrical connection apparatus is located.

As shown in FIG. 1, the printed circuit board 2 may include the substrate 21 and the plurality of second contacts 22. Each second contact 22 may also be referred to as a conductive pin, and the plurality of second contacts 22 may also be referred to as golden fingers.

As shown in FIG. 1, the plurality of second contacts 22 are fixedly located on the surface of the substrate 21. For example, the plurality of second contacts 22 may be fixedly located on an upper surface of the substrate 21. For another example, the plurality of second contacts 22 may be located on a lower surface of the substrate 21. The plurality of second contacts 22 may be arranged in an array on the surface of the substrate 21. For example, as shown in FIG. 1, the plurality of second contacts 22 may be arranged in two rows on the surface of the substrate 21.

The cable connector 1 and the printed circuit board 2 are electrically connected when the first contact 12 is in contact with the second contact 22. Therefore, a manner of arranging the plurality of first contacts 12 corresponds to a manner of arranging the plurality of second contacts 22. It should be noted that the manner of arranging the plurality of first contacts 12 and the manner of arranging the plurality of second contacts 22 in FIG. 1 are merely used as examples, and constitute no specific limitation.

In this way, when the cable connector 1 and the printed circuit board 2 are fitted, in other words, when the cable connector 1 is assembled on the printed circuit board 2, the first contact 12 in the cable connector 1 is in contact with the second contact 22 on the printed circuit board 2, so that the cable connector 1 and the printed circuit board 2 are electrically connected.

The electrical connection between the cable connector 1 and the printed circuit board 2 is flexible contact, and therefore a pressing structure is required to tightly press the cable connector 1 onto the board surface of the printed circuit board 2, so that the first contact 12 in the cable connector 1 and the second contact 22 on the printed circuit board 2 are in close contact, to improve stability of the electrical connection between the cable connector 1 and the printed circuit board 2. Close contact means that the first contact 12 and the second contact 22 are in close contact, and there is acting force between the first contact 12 and the second contact 22.

Figure 2:
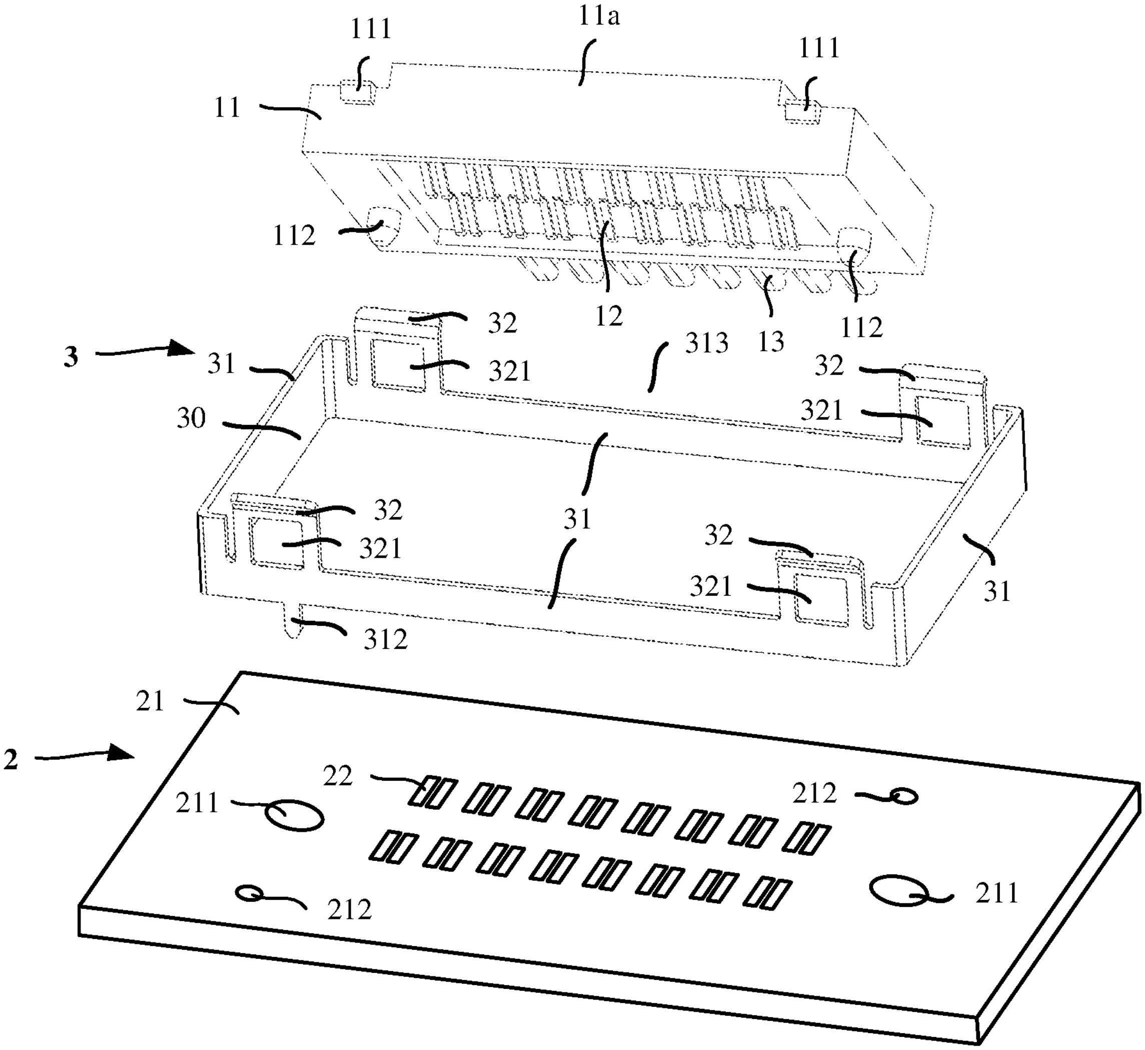
FIG. 2 is a schematic diagram of an explosive structure of an electrical connection apparatus according to this application.

Correspondingly, as shown in FIG. 2, the electrical connection apparatus further includes a fastened wall 3, and the fastened wall 3 includes a plurality of sidewalls 31. The plurality of sidewalls 31 are fastened to the substrate 21 of the printed circuit board 2, and the plurality of sidewalls 31 are located on two opposite sides of the plurality of second contacts 22.

The sidewall 31 and the substrate 21 may be fastened through welding, by using adhesive, by using a screw, through press-fitting, or the like.

There may be at least the following several manners in which the plurality of sidewalls 31 are located on the two opposite sides of the second contacts 22.

For example, a manner may be as follows: The plurality of sidewalls 31 may be divided into two parts. Some sidewalls 31 are located on a first side of the second contacts 22, and the other sidewalls 31 are located on a second side of the second contacts 22. The first side and the second side are opposite to each other.

When the cable connector 1 and the printed circuit board 2 are fitted, the connecting terminal 11 in the cable connector 1 is located in the fastened wall 3. This may be understood as that the connecting terminal is located between the two parts of sidewalls 31. The cable connector 1 and the fastened wall 3 may be fastened in a detachable manner. After the cable connector 1 and the fastened wall 3 are fastened, the first contact 12 and the second contact 22 are in close contact.

For another example, another manner may be as follows: The plurality of sidewalls 31 may be divided into three parts. Some sidewalls 31 are located on a first side of the second contacts 22, some sidewalls 31 are located on a second side of the second contacts 22, and the remaining sidewalls 31 are located on a third side of the second contacts 22. The first side and the second side are opposite to each other, and the third side and the first side are adjacent to each other.

When the cable connector 1 and the printed circuit board 2 are fitted, the connecting terminal 11 in the cable connector 1 is located in the fastened wall 3. This may be understood as that the connecting terminal is located between the three parts of sidewalls 31. The cable connector 1 and the fastened wall 3 may be fastened in a detachable manner. After the cable connector 1 and the fastened wall 3 are fastened, the first contact 12 and the second contact 22 are in close contact.

For another example, another manner may be as follows: The plurality of sidewalls 31 may be divided into four parts. Some sidewalls 31 are located on a first side of the second contacts 22, some sidewalls 31 are located on a second side of the second contacts 22, some sidewalls 31 are located on a third side of the second contacts 22, and the remaining sidewalls 31 are located on a fourth side of the second contacts 22. The first side and the second side are opposite to each other, the third side and the first side are adjacent to each other, and the fourth side and the third side are opposite to each other. In this manner, the plurality of sidewalls 31 surround the plurality of second contacts 22, and the plurality of sidewalls 31 enclose annular space 30.

When the cable connector 1 and the printed circuit board 2 are fitted, the connecting terminal 11 in the cable connector 1 is located in the fastened wall 3. This may be understood as that the connecting terminal is located in the annular space 30 enclosed by the four parts of sidewalls 31. The cable connector 1 and the fastened wall 3 may be fastened in a detachable manner. After the cable connector 1 and the fastened wall 3 are fastened, the first contact 12 and the second contact 22 are in close contact.

For cases in which the plurality of sidewalls 31 are divided into three parts and four parts, there may be or may not be a connection relationship between two adjacent sidewalls. If there is a connection relationship, the plurality of sidewalls 31 may be head-to-tail connected.

In this embodiment, a quantity of sidewalls 31 included in the fastened wall 3 and a length of each sidewall 31 are not limited, and a manner of arranging the sidewalls 31 around the plurality of second contacts 22 is also not limited, and may be flexibly designed.

Based on the foregoing description, the fastened wall 3 used to tightly press the connecting terminal 11 in the cable connector 1 onto the printed circuit board 2 includes the plurality of sidewalls 31, and has a simple structure. During assembly of the cable connector 1 and the printed circuit board 2, the connecting terminal 11 in the cable connector 1 is moved downward from a direction directly above the fastened wall 3 to a direction close to the printed circuit board 2, and when the connecting terminal is moved downward to the fastened wall 3, the cable connector 1 and the fastened wall 3 are fastened in the detachable manner. It may be learned that during assembly of the cable connector 1 and the printed circuit board 2, an operation is always performed in a direction that is directly above the fastened wall 3 and that is far away from the printed circuit board 2, and space, on the printed circuit board 2, around the fastened wall 3 is not affected. Therefore, the fastened wall 3 that serves a fastener for tightly pressing the cable connector 1 onto the printed circuit board 2 occupies relatively small space on the printed circuit board 2, and space on the printed circuit board 2 can be saved. In addition, another component may be further arranged in the space, on the printed circuit board 2, around the fastened wall 3, so that a relatively large quantity of components may be mounted on the printed circuit board 2, to facilitate high-density development.

For ease of description, in the accompanying drawings in this embodiment, an example in which the plurality of sidewalls 31 of the fastened wall 3 are head-to-tail connected, to form the annular space 30 may be used. Referring to FIG. 2, the fastened wall 3 may also be referred to as an enclosure frame. The annular space 30 matches the connecting terminal 11, and is used to accommodate the connecting terminal 11.

A contour shape of the fastened wall 3 matches a contour shape of the connecting terminal 11. For example, if the contour shape of the connecting terminal 11 is a rectangle, the fastened wall 3 may be a quadrilateral frame.

In an example, the quantity of sidewalls 31 is related to the shape of the fastened wall 3. For example, if the fastened wall 3 is a quadrilateral frame, there may be four sidewalls 31. A size of each sidewall 31 is also related to the shape of the fastened wall 3. For example, if the fastened wall 3 is a rectangle, in the four sidewalls 31, two sidewalls 31 may be equal in size, and the other two sidewalls 31 may be equal in size.

The quantity of sidewalls 31 and the size of each sidewall 31 are not limited in this embodiment, and may be flexibly designed.

In an example, when the connecting terminal 11 is located in the annular space 30 of the fastened wall 3, to avoid the plurality of cables 13, correspondingly, as shown in FIG. 2, there may be an opening 313 on the sidewall 31. A length of the opening 313 in a length direction of the sidewall 31 matches a total width of the plurality of cables 13. For example, the length of the opening 313 is greater than the total width of the plurality of cables 13. In this way, when the connecting terminal 11 is located in the annular space 30 of the fastened wall 3, the plurality of cables 13 connected to the connecting terminal 11 may pass through the opening 313 on the sidewall 31 and extend distally.

In an example, the opening 313 may be disposed on one of the sidewalls 31 of the fastened wall 3. As shown in FIG. 2, the opening 313 may be disposed on each of two opposite sidewalls 31 of the fastened wall 3. Alternatively, the opening 313 may be disposed on each sidewall 31 of the fastened wall 3. A specific position of the opening 313 is not limited in this embodiment, and may be flexibly designed.

Figure 3:
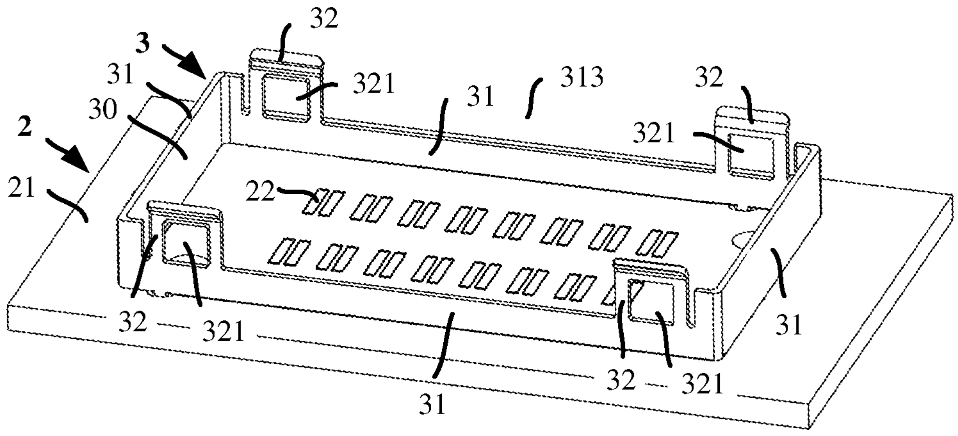
FIG. 3 is a schematic diagram of a structure that exists after a printed circuit board and a fastened wall of an electrical connection apparatus are fastened according to this application.

As shown in FIG. 3, bottoms of the plurality of sidewalls 31 in a height direction are fastened to the substrate 21 of the printed circuit board 2, and the plurality of sidewalls 31 surround the plurality of second contacts 22.

Figure 4:
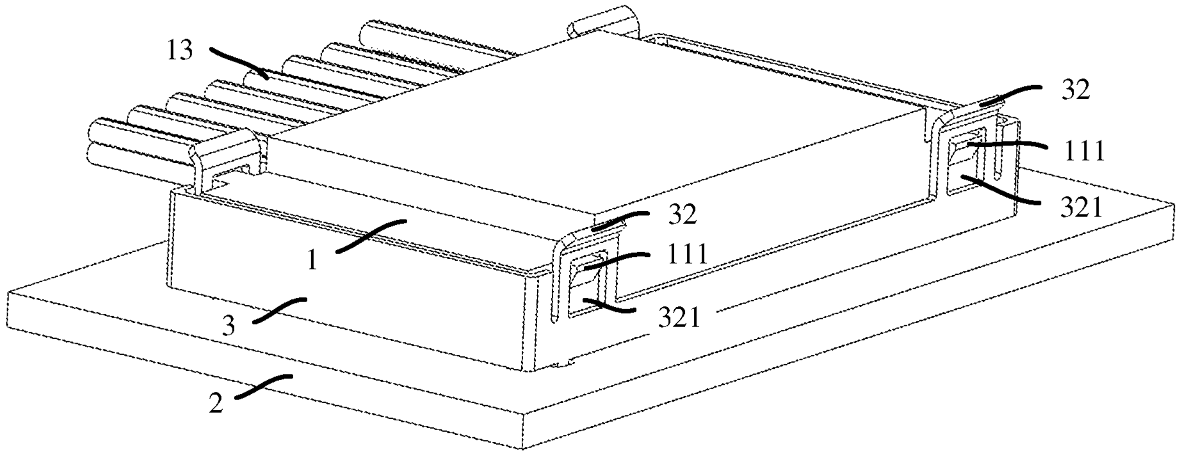
FIG. 4 is a schematic diagram of a structure of an electrical connection apparatus according to this application.

When the cable connector 1 and the printed circuit board 2 need to be fitted, as shown in FIG. 4, the connecting terminal 11 in the cable connector 1 may be placed in the annular space 30 of the fastened wall 3, and the cable connector 1 and the fastened wall 3 are fastened in the detachable manner, so that the first contact 12 in the cable connector 1 and the second contact 22 on the fastened wall 3 are in close contact.

There are a plurality of manners of detachably fastening the cable connector 1 and the fastened wall 3. For example, the cable connector 1 and the fastened wall 3 may be detachably fastened through snap-fitting. For another example, the cable connector 1 and the fastened wall 3 may be detachably fastened by using a screw. An example in which the cable connector 1 and the printed circuit board 2 are detachably fastened through snap-fitting may be used below.

Figure 11:
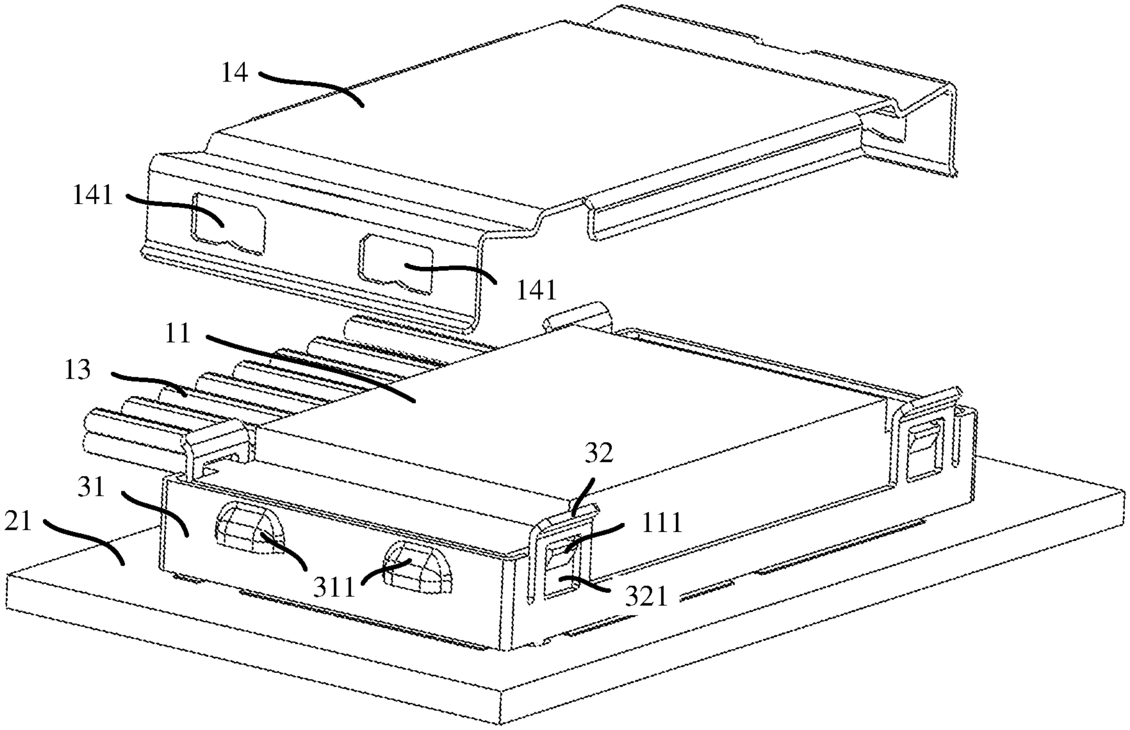
FIG. 11 is a schematic diagram of an explosive structure of an electrical connection apparatus according to this application.

Snap-fitting of the cable connector 1 and the fastened wall 3 may be snap-fitting of the connecting terminal 11 in the cable connector 1 and the fastened wall 3 shown in FIG. 2, snap-fitting of a shielding can 14 in the cable connector 1 and the fastened wall 3 shown in FIG. 11, or snap-fitting of the connecting terminal 11 and the fastened wall 3 and snap-fitting of a shielding can 14 and the fastened wall 3 in FIG. 11. Snap-fitting of the cable connector 1 and the fastened wall 3 is described below in detail.

Based on the foregoing description, the fastened wall 3 in the electrical connection apparatus has a simple structure, and includes the plurality of sidewalls 31 that are head-to-tail connected. The fastened wall 3 is fastened to the printed circuit board 2, and occupies relatively small space on the printed circuit board 2, and therefore the space on the printed circuit board 2 can be saved. In addition, another component may be further arranged in the space, on the printed circuit board 2, around the fastened wall 3, to facilitate high-density development of the printed circuit board 2.

When the cable connector 1 is assembled on the printed circuit board 2, to improve precision of aligning the first contact 12 in the cable connector 1 and the second contact 22 on the printed circuit board 2, correspondingly, as shown in FIG. 2, there are a plurality of first positioning rods 112 at the bottom of the connecting terminal 11. For example, as shown in FIG. 1, there may be two first positioning rods 112, and the two first positioning rods 112 may be distributed at directly opposite positions, or may be diagonally distributed. This is not limited in this embodiment.

As shown in FIG. 2, there is a first positioning hole 211 that matches the first positioning rod 112 on the substrate 21. A quantity of first positioning holes 211 is equal to a quantity of first positioning rods 112, and the first positioning hole 211 is in a one-to-one correspondence with the first positioning rod 112.

In this way, in a process of assembling the cable connector 1 on the printed circuit board 2, the first positioning rod 112 of the connecting terminal 11 is first inserted into the first positioning hole 211 on the substrate 21, to implement pre-positioning, and then the cable connector 1 and the fastened wall 3 are snap-fitted. In this way, the precision of aligning the first contact 12 and the second contact 22 may be improved.

The first positioning rod 112 and the first positioning hole 211 are fitted, so that the precision of aligning the first contact 12 and the second contact 22 can be improved, and a speed of assembling the cable connector 1 and the printed circuit board 2 can be increased, to facilitate batch assembly and improve assembly efficiency.

In this embodiment of this application, the quantity of first positioning rods 112 is not limited, and distribution of the plurality of first positioning rods 112 is also not limited, provided that the connecting terminal 11 can be pre-positioned on the surface of the substrate 21.

The first positioning rod 112 and the first positioning hole 211 may be interchanged. For example, there may be a positioning hole at the bottom of the connecting terminal 11, and there is a positioning rod on the substrate 21. Whether the positioning rod is located on the connecting terminal 11 or the substrate 21 is not limited in this application, provided that the connecting terminal 11 can be pre-positioned on the surface of the substrate 21.

Similarly, to improve precision of assembling the fastened wall 3 and the substrate 21 and increase an assembly speed, correspondingly, as shown in FIG. 2, there are a plurality of second positioning rods 312 at a bottom of the fastened wall 3. For example, as shown in FIG. 2, there may be two second positioning rods 312. There is one second positioning rod 312 on each of bottoms of two adjacent sidewalls 31 of the fastened wall 3. The two second positioning rods 312 may be located at directly opposite positions, may be diagonally located, as shown in FIG. 2, or the like. This is not limited in this embodiment.

As shown in FIG. 2, there is a second positioning hole 212 that matches the second positioning rod 312 on the substrate 21. A quantity of second positioning holes 212 is equal to a quantity of second positioning rods 312, and the second positioning hole 212 is in a one-to-one correspondence with the second positioning rod 312.

In this way, before the bottom of the fastened wall 3 and the substrate 21 are fastened, the second positioning rod 312 on the fastened wall 3 may be first inserted into the second positioning hole 212 on the substrate 21, to implement pre-positioning, and then the fastened wall 3 and the substrate 21 are fastened.

In this embodiment of this application, the quantity of second positioning rods 312 is not limited, and distribution of the plurality of second positioning rods 312 is also not limited, provided that the fastened wall 3 can be pre-positioned on the surface of the substrate 21.

The second positioning rod 312 and the second positioning hole 212 may be interchanged. For example, there may be a positioning hole at the bottom of the fastened wall 3, and there is a positioning rod on the substrate 21. Whether the positioning rod is located on the fastened wall 3 or the substrate 21 is not limited in this application, provided that the fastened wall 3 can be pre-positioned on the surface of the substrate 21.

As described above, snap-fitting of the cable connector 1 and the fastened wall 3 may be that the connecting terminal 11 is snap-fitted into the fastened wall 3. For example, as shown in FIG. 2, the fastened wall 3 may include a plurality of elastic plates 32. Each elastic plate 32 is connected to the sidewall 31. The elastic plate 32 can rotate around a connection point relative to the connected sidewall 31. The connecting terminal 11 and the fastened wall 3 are snap-fitted under the action of the elastic plate 32.

In an example, there may be two elastic plates 32, and the two elastic plates 32 may be respectively connected to two opposite sidewalls 31. In another example, there may be three elastic plates 32, and the three elastic plates 32 may be respectively connected to three sidewalls 31, or two elastic plates 32 may be connected to one sidewall 31, and the other elastic plate 32 may be connected to another sidewall 31 opposite to the sidewall 31. In another example, there may be four elastic plates 32, and the four elastic plates 32 may be respectively connected to four sidewalls 31, or two elastic plates 32 may be connected to one sidewall 31, and the other two elastic plates 32 may be connected to another sidewall 31 opposite to the sidewall 31.

In this embodiment, a specific quantity of elastic plates 32 is not limited, and sidewalls 31 to which the plurality of elastic plates 32 are respectively connected are not limited. This may be flexibly designed.

In an example, the elastic plate 32 and the sidewall 31 may be connected in a plurality of manners. For example, in a manner, the elastic plate 32 and the connected sidewall 31 may be integrally formed. In an example, a plurality of strip-shaped slits may be disposed in a height direction of the sidewall 31, and the elastic plate 32 is formed between two adjacent strip-shaped slits. In another example, as shown in FIG. 2, the opening 313 for avoiding the plurality of cables 13 may be disposed on the sidewall 31, and for the sidewall 31 on which the opening 313 is disposed, a strip-shaped slit is disposed on one side of the opening 313. In this case, the elastic plate 32 may be formed between the opening 313 and the strip-shaped slit.

In another example, the elastic plate 32 and the sidewall 31 may be connected through welding. For example, a bottom of the elastic plate 32 in a height direction is welded to a top of the sidewall 31 in the height direction.

A specific manner of connecting the elastic plate 32 and the sidewall 31 is not limited in this embodiment.

As described above, the elastic plate 32 is used to snap-fit the connecting terminal 11 and the fastened wall 3. There are a plurality of snap-fitting manners. For example, a manner may be as follows: As shown in FIG. 2, a first end of the elastic plate 32 in the height direction is connected to the sidewall 31, and a second end in the height direction is far away from the connected sidewall 31. In other words, the elastic plate 32 stands on the connected sidewall 31, for example, may stand upright on the connected sidewall 31, and a plane on which the elastic plate 32 is located and a plane on which the connected sidewall 31 is located are co-planar. For another example, the elastic plate 32 is inclined to stand on the connected sidewall 31, and there is an obtuse angle between a plane on which the elastic plate 32 is located and a plane on which the connected sidewall 31 is located.

Each elastic plate 32 is provided with a first positioning hole 321, and there are a plurality of first positioning protrusions 111 on a side surface 11*a* of the connecting terminal 11. The first positioning hole 321 matches the first positioning protrusion 111. When the connecting terminal 11 is located in the annular space 30 of the fastened wall 3, the first positioning protrusion 111 may be located in the first positioning hole 321.

The first positioning protrusion 111 is located in the first positioning hole 321, to snap-fit the connecting terminal 11 and the fastened wall 3.

The connecting terminal 11 and the fastened wall 3 are snap-fitted by fitting the first positioning protrusion 111 and the first positioning hole 321. Therefore, it is relatively convenient to assemble the cable connector 1 on the printed circuit board 2 and detach the cable connector 1 from the printed circuit board 2, and efficiency of assembly and detachment between the cable connector 1 and the printed circuit board 2 may be improved.

Figure 6:
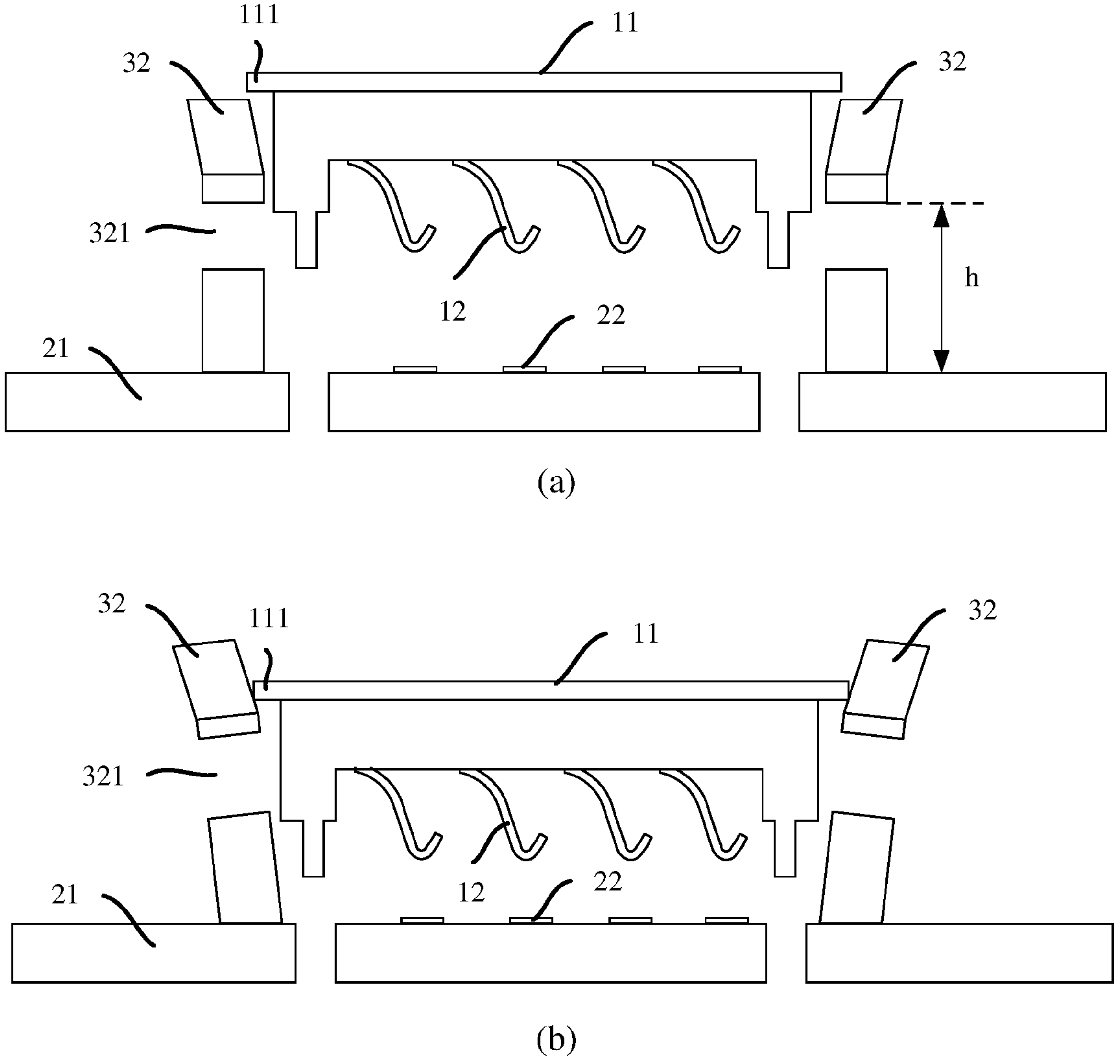
FIG. 6 is a schematic diagram of a process of fitting a first contact and a second contact in an electrical connection apparatus according to this application.
Figure 7:
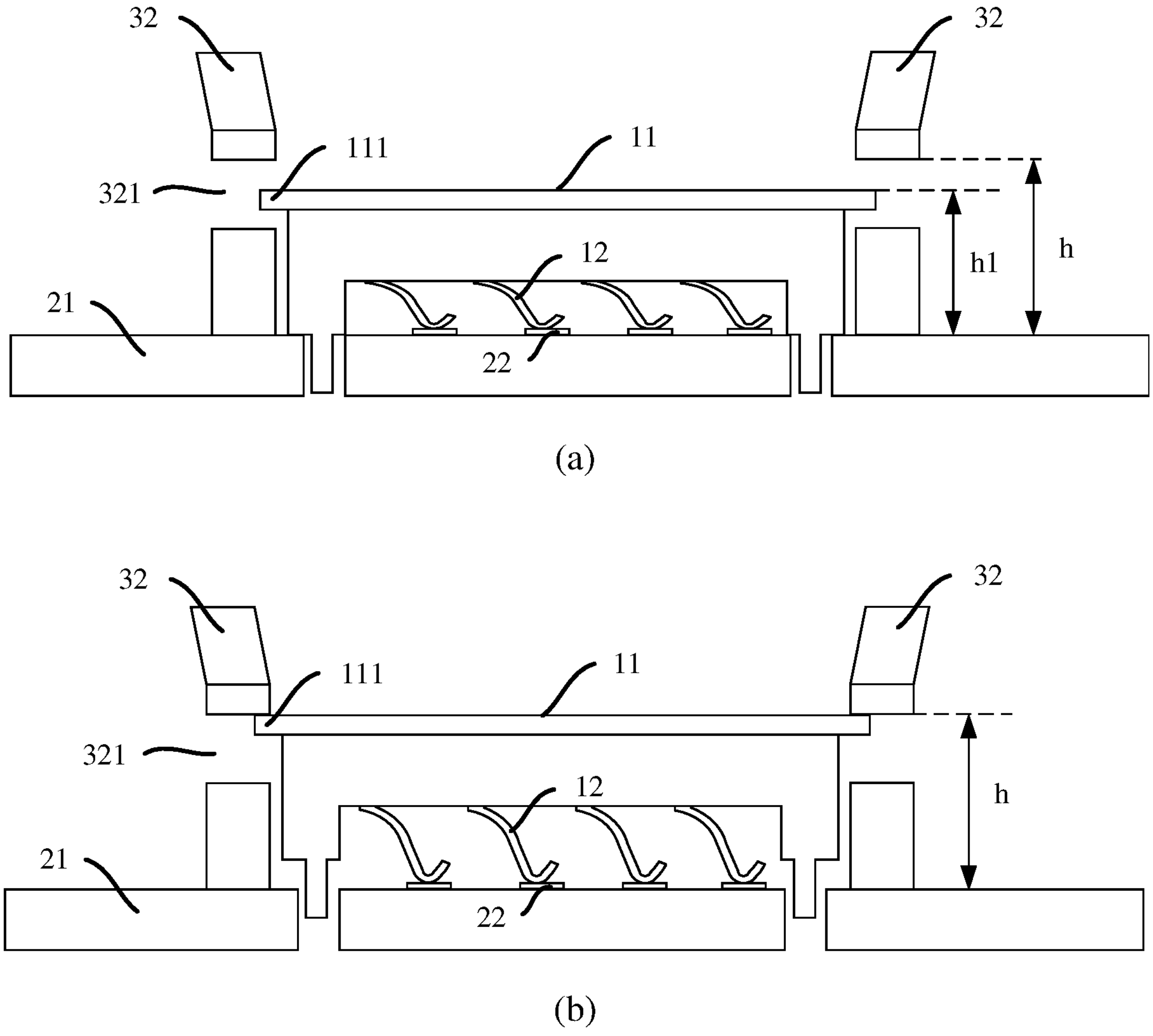
FIG. 7 is a schematic diagram of a process of fitting a first contact and a second contact in an electrical connection apparatus according to this application.

FIG. 6 and FIG. 7 are a schematic diagram of a process of assembling the cable connector 1, the printed circuit board 2, and the fastened wall 3. As shown in FIG. 6, in a process of moving downward the connecting terminal 11 in the cable connector 1 to the fastened wall 3 from a direction directly above the fastened wall 3 to a direction close to the fastened wall 3, as shown in (a) in FIG. 6, the first positioning protrusion 111 located on the side surface of the connecting terminal 11 is in contact with the elastic plate 32. When the connecting terminal 11 continues to be moved downward in a direction close to the substrate 21, as shown in (b) in FIG. 6, the elastic plate 32 rotates out of a frame of the fastened wall 3 around the connection point relative to the connected sidewall 31, so that the elastic plate 32 is extended out of the frame of the fastened wall 3, and then the connecting terminal 11 can continue to be moved in the direction close to the substrate 21.

When the first positioning protrusion 111 on a side surface of the connecting terminal 11 is moved downward to the first positioning hole 321, the elastic plate 32 rebounds to a natural state, as shown in (a) in FIG. 7. In this case, the connecting terminal 11 can be moved downward and further downward movement is stopped when the bottom of the connecting terminal 11 is in contact with the substrate 21, or the connecting terminal 11 can be moved downward and further downward movement is stopped when the first contact 12 is compressed to a limit position. In FIG. 7, (a) may be a schematic diagram in which downward movement of the connecting terminal 11 is stopped because the bottom of the connecting terminal 11 is in contact with the substrate 21, or may be a schematic diagram in which downward movement of the connecting terminal 11 is stopped because the first contact 12 is compressed to the limit position.

After external force exerted for moving downward the connecting terminal 11 is removed, the connecting terminal 11 moves upward under the action of elastic force of the first contact 12, and stops moving upward when the first positioning protrusion 111 of the connecting terminal 11 is in contact with an upper edge of the first positioning hole 321, as shown in (b) in FIG. 7. In this case, the first contact 12 is still compressed between the connecting terminal 11 and the second contact 22. In this way, under the action of fitting the first positioning protrusion 111 and the first positioning hole 321, the first contact 12 is compressed between the second contact 22 and the bottom of the connecting terminal 11, so that the first contact 12 and the second contact 22 can be in close contact, to improve stability of an electrical connection.

To implement that the first contact 12 can still be compressed on the second contact 22 when the first positioning protrusion 111 is in contact with the upper edge of the first positioning hole 321, a value of a height h between the upper edge of the first positioning hole 321 and a bottom of the connected sidewall 31 may be greater than or equal to $h_1$ and less than $h_2$. Herein, $h_1$ is a distance that is between the substrate 21 and a position, of the connecting terminal 11, used to be in contact with the upper edge of the first positioning hole 321 and that exists when the connecting terminal 11 is moved downward to be closest to the substrate 21, as shown in (a) in FIG. 7, and $h_2$ is a distance that is between the substrate 21 and the position, of the connecting terminal 11, used to be in contact with the upper edge of the first positioning hole 321 and that exists when the connecting terminal 11 moves, under the action of rebound force of the first contact 12, upward to be furthest away from the substrate 21.

A distance between the upper edge and a lower edge of the first positioning hole 321, namely, a height of the first positioning hole 321, is related to a length of the first positioning protrusion 111 in the height direction (namely, a height of the first positioning protrusion 111). For example, the height of the first positioning hole 321 is greater than the height of the first positioning protrusion 111. To increase a speed of processing the first positioning hole 321, the height of the first positioning hole 321 may be much greater than the height of the first positioning protrusion 111. The height of the first positioning hole 321 is much greater than the height of the first positioning protrusion 111, and therefore a requirement on precision of processing the first positioning hole 321 is lowered, and the speed of processing the first positioning hole 321 can be increased.

In this way, during processing of the fastened wall 3, the height h between the upper edge of the first positioning hole 321 and the bottom of the sidewall 31 may be flexibly selected based on a rebound status of the first contact 12 and a contact requirement between the first contact 12 and the second contact 22, so that the fastened wall 3 can adapt to different first contacts 12 and different contact requirements, to improve an application scenario of the fastened wall 3.

In an example, to further enable the first contact 12 and the second contact 22 to be in close contact, the connecting terminal 11 in the cable connector 1 and the substrate 21 of the printed circuit board 2 may be fastened by using a screw, to further reinforce good contact between the first contact 12 and the second contact 22.

In addition, if the connecting terminal 11 and the substrate 21 are connected by using a screw, the screw connection can enable the first contact 12 and the second contact 22 to be in close contact. In this case, the requirement on the precision of processing the first positioning hole 321 may be lowered, to increase the speed of processing the first positioning hole 321.

Whether the connecting terminal 11 and the substrate 21 are fastened by using a screw is not limited in this embodiment, and may be flexibly designed.

In an example, as shown in FIG. 6 and FIG. 7, the first contact 12 in the cable connector 1 is in a shape of a check mark. In this structure, when the connecting terminal 11 is moved downward in the direction close to the substrate 21, the first contact 12 is compressed, and a bottommost part of the first contact 12 moves on the second contact 22 to clean the second contact 22. Then, the first contact 12 rebounds, and the bottommost part of the first contact 12 is in contact with a cleaned position of the second contact 22. It may be learned that in this shape of a check mark of the first contact 12, dust on a surface of the second contact 22 can be automatically cleared.

In an example, to enable the connecting terminal 11 to smoothly enter space in the frame of the fastened wall 3, correspondingly, as shown in FIG. 4 and with reference to FIG. 6, the second end that is of each elastic plate 32 and that is far away from the connected sidewall 31 is bent out of the frame of the fastened wall 3.

There may be an obtuse angle or a round angle at a bent position of the elastic plate 32.

As shown in FIG. 6, in the structure of the elastic plate 32, the connecting terminal 11 can gradually extend the elastic plate 32 during downward movement, and is smoothly moved downward to the fastened wall 3.

Figure 5:
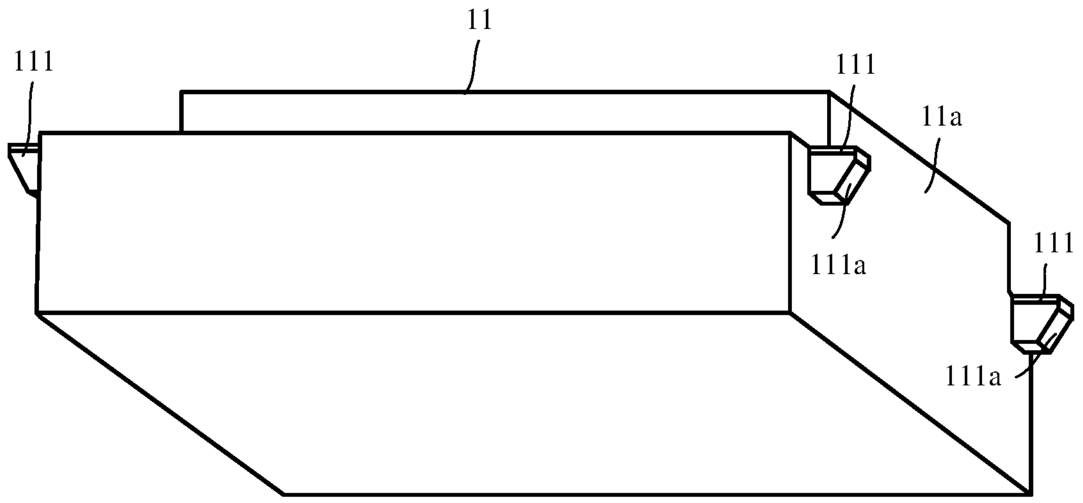
FIG. 5 is a schematic diagram of a structure of a connecting terminal in an electrical connection apparatus according to this application.

In an example, to enable the connecting terminal 11 to smoothly enter the space in the frame of the fastened wall 3, correspondingly, as shown in FIG. 5, an end face that is of each first positioning protrusion 111 and that is far away from the side surface 11*a* on which the first positioning protrusion 111 is located includes an inclined surface 111*a*. An intersection line between a plane on which the inclined surface 111*a* is located and the side surface 11*a* is located below the first positioning protrusion 111, and there is a direction close to the printed circuit board 2 below the first positioning protrusion 111.

The inclined surface 111*a* of the first positioning protrusion 111 may match an inclined surface at the second end of the elastic plate 32. When the connecting terminal 11 is moved downward to the space in the frame of the fastened wall 3, the inclined surface ma of the first positioning protrusion 111 may be in contact with the inclined surface at the second end of the elastic plate 32, and then the connecting terminal 11 gradually extends the elastic plate 32 out of the frame of the fastened wall 3 during downward movement, so that the connecting terminal 11 smoothly enters the space in the frame of the fastened wall 3.

In the foregoing description, the connecting terminal 11 in the cable connector 1 is snap-fitted into the fastened wall 3 by fitting the first positioning protrusion 111 and the first positioning hole 321. Another example in which the connecting terminal 11 is snap-fitted into the fastened wall 3 by using the elastic plate 32 is described below.

Figure 8:
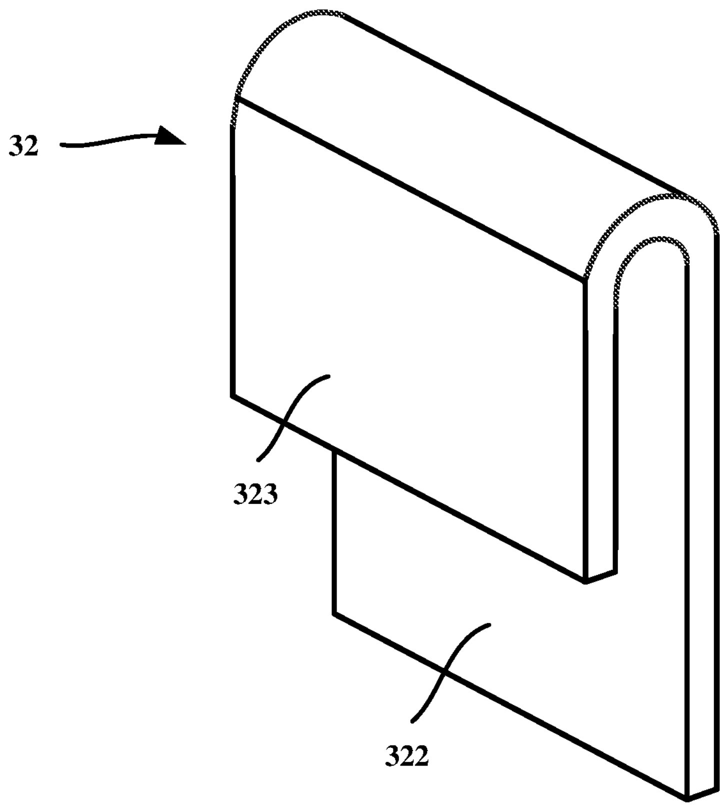
FIG. 8 is a schematic diagram of a structure of an elastic plate in an electrical connection apparatus according to this application.
Figure 9:
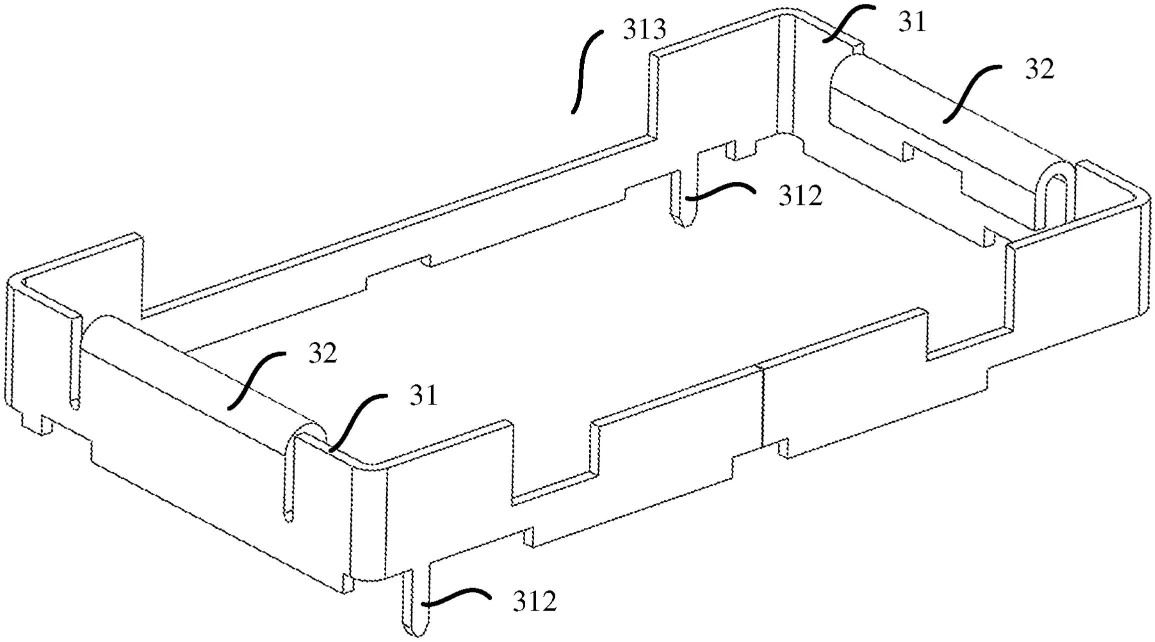
FIG. 9 is a schematic diagram of a structure of a fastened wall in an electrical connection apparatus according to this application.
Figure 10:
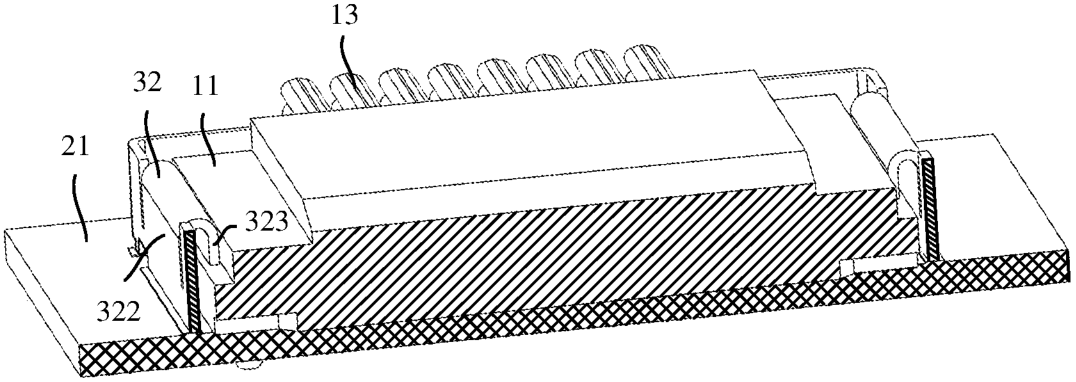
FIG. 10 is a schematic diagram of a cross-sectional structure of an electrical connection apparatus according to this application.

As shown in FIG. 8, each elastic plate 32 includes a parent body 322 and a folding body 323 formed through folding. As shown in FIG. 9, the parent body 322 is connected to the sidewall 31, and the folding body 323 is located in the fastened wall 3. As shown in FIG. 10, the folding body 323 of each elastic plate 32 is located on an upper surface that is of the connecting terminal 11 and that is far away from the substrate 21.

An angle between the folding body 323 and the parent body 322 may be greater than or equal to 0 degrees and less than 90 degrees.

Values of a distance between an end of the folding body 323 and a bottom of the connected sidewall 31 and the height h between the upper edge of the first positioning hole 321 and the bottom of the connected sidewall 31 may be the same, and are both greater than or equal to $h_1$, and less than $h_2$. In this case, $h_1$, is a distance that is between the substrate 21 and a position, of the connecting terminal 11, used to be in contact with the folding body 323 and that exists when the connecting terminal 11 is moved downward to be closest to the substrate 21, and $h_2$ is a distance that is between the substrate 21 and the position, of the connecting terminal 11, used to be in contact with folding body 323 and that exists when the connecting terminal 11 moves, under the action of rebound force of the first contact 12, upward to be furthest away from the substrate 21.

In an example, if the connecting terminal 11 has a relatively large thickness, to implement that the folding body 323 is located on the upper surface of the connecting terminal 11, the elastic plate 32 needs to have a relatively large height and a relatively large size. To reduce the size of the elastic plate 32, correspondingly, as shown in FIG. 10, there may be a step at the position, of the connecting terminal 11, used to be in contact with the folding body 323. In this case, the folding body 323 may be located on an upper surface, of the step, close to the substrate 21. In this way, an overall height of the elastic plate 32 is equivalent to a height of the connected sidewall 31, and is not excessively large.

The connecting terminal 11 and the fastened wall 3 may be snap-fitted by pressing the elastic plate 32 onto the upper surface that is of the connecting terminal 11 and that is far away from the substrate 21. In this snap-fitting manner, it is relatively convenient to mount the cable connector 1 on the printed circuit board 2, and efficiency of assembly between the cable connector 1 and the printed circuit board 2 may be improved.

Based on the foregoing description, in the manner of snap-fitting the connecting terminal 11 and the fastened wall 3, automatic batch assembly of the cable connector 1 and the printed circuit board 2 can be implemented, to improve assembly efficiency. This is because if there is no snap-fitting relationship between the connecting terminal 11 and the fastened wall 3, during assembly, after the connecting terminal 11 is placed in the fastened wall 3 but before the connecting terminal 11 is fastened to the fastened wall 3 by using a fastener, the connecting terminal 11 is detached from the fastened wall 3 under the action of the cable 13 due to a relatively small size. Therefore, the connecting terminal 11 needs to be pressed into the fastened wall 3, and then the connecting terminal 11 is fastened to the fastened wall 3 by using the fastener. It may be learned that when the connecting terminal 11 is placed in the fastened wall 3, the connecting terminal 11 and the fastened wall 3 are snap-fitted, so that the connecting terminal 11 is stably placed in the fastened wall 3. In this case, in a subsequent procedure, the connecting terminal 11 does not need to be pressed, and the connecting terminal 11 is not detached from the fastened wall 3. Therefore, in the manner of snap-fitting the connecting terminal 11 and the fastened wall 3, a pre-fastening function can be further achieved, to improve the efficiency of assembly between the cable connector 1 and the printed circuit board 2. In addition, in the snap-fitting relationship between the connecting terminal 11 and the fastened wall 3, screw-free mounting can be implemented.

In the foregoing description, there is a solution in which the cable connector 1 and the fastened wall 3 are snap-fitted by using the connecting terminal 11. In this solution, the connecting terminal 11 is snap-fitted into the fastened wall 3 by using the elastic plate 32. A solution in which the cable connector 1 and the fastened wall are snap-fitted by using a shielding can 14 is described below.

As shown in FIG. 11, the cable connector 1 may include the shielding can 14. The shielding can 14 can be used to reduce interference caused by a signal of a surrounding component to a signal transmitted in the electrical connection apparatus, and may be further used to reduce interference caused by the signal transmitted in the electrical connection apparatus to a signal of another component.

In an example, the shielding can 14 may cover a surface that is of the connecting terminal 11 and that is far away from the substrate 21, and cover the connecting terminal 11. The shielding can 14 and the connecting terminal 11 may be fastened. For example, the shielding can 14 and the connecting terminal 11 may be fastened in a detachable manner. For another example, the shielding can 14 and the connecting terminal 11 may be fastened in a non-detachable manner. For example, the shielding can 14 and the connecting terminal 11 are welded. In this manner, the shielding can 14 and the connecting terminal 11 are of an integral structure, are simultaneously mounted on the printed circuit board 2, and are simultaneously detached from the printed circuit board 2.

In an example, the shielding can 14 and the fastened wall 3 may be detachably fastened. For another example, the shielding can 14 and the fastened wall 3 may be snap-fitted. As shown in FIG. 11, the shielding can 14 is provided with a second positioning hole 141, there is a second positioning protrusion 311 on the sidewall 31, and the second positioning protrusion 311 is located in the second positioning hole 141, to snap-fit the shielding can 14 and the fastened wall 3.

There may be a plurality of second positioning protrusions 311. For example, there may be two second positioning protrusions 311, and the two second positioning protrusions 311 may be respectively located on outer surfaces of two opposite sidewalls 31. For another example, there may be three second positioning protrusions 311, and the three second positioning protrusions 311 may be respectively located on three sidewalls 31, or two second positioning protrusions 311 may be located on one sidewall 31, and the other second positioning protrusion 311 may be located on another sidewall 31 opposite to the sidewall 31. For another example, there may be four second positioning protrusions 311, and the four second positioning protrusions 311 may be respectively located on four sidewalls 31, or two second positioning protrusions 311 may be located on one sidewall 31, and the other two second positioning protrusions 311 may be located on another sidewall 31 opposite to the sidewall 31.

In this embodiment, a specific quantity of second positioning protrusions 311 is not limited, and sidewalls 31 on which the plurality of second positioning protrusions 311 are respectively located are not limited. This may be flexibly designed.

A quantity of second positioning holes 141 is the same as the quantity of second positioning protrusions 311, and a position of the second positioning hole 141 corresponds to a position of the second positioning protrusion 311.

It should be noted that the second positioning protrusion 311 and the second positioning hole 141 may be interchanged. For example, the shielding can 14 is provided with a positioning hole, and there is a positioning protrusion on the sidewall 31 of the fastened wall 3.

In this way, a snap-fitting relationship between the shielding can 14 and the fastened wall 3 may be implemented by fitting the second positioning protrusion 311 and the second positioning hole 141.

Certainly, the shielding can 14 and the fastened wall 3 may be fastened by using a screw.

Through detachable fastening of the shielding can 14 and the fastened wall 3, the connecting terminal 11 can be further tightly pressed into the fastened wall 3, so that the first contact 12 and the second contact 22 are in close contact.

Based on the foregoing description, there may be at least the following several solutions in which the cable connector 1 and the printed circuit board 2 are snap-fitted.

Solution 1: The connecting terminal 11 and the fastened wall 3 are snap-fitted, and the shielding can 14 and the fastened wall 3 are not snap-fitted. In this solution, the shielding can 14 may be fastened to the connecting terminal 11, for example, an inner surface of the shielding can 14 and an outer surface of the connecting terminal 11 are welded, and the first contact 12 in the cable connector 1 and the second contact 22 on the printed circuit board 2 are in close contact through snap-fitting of the connecting terminal 11 and the fastened wall 3.

Solution 2: The connecting terminal 11 and the fastened wall 3 are not snap-fitted, and the shielding can 14 and the fastened wall 3 are snap-fitted. In this solution, the connecting terminal 11 and the fastened wall 3 are not snap-fitted, and therefore the fastened wall 3 may not include the elastic plate 32, and includes the plurality of sidewalls 31. In addition, the connecting terminal 11 and the fastened wall 3 are not snap-fitted, and therefore during assembly, after the connecting terminal 11 is placed in the fastened wall 3, the connecting terminal 11 needs to be pressed, to avoid detachment from the fastened wall 3. To avoid pressing the connecting terminal 11, correspondingly, the shielding can 14 and the connecting terminal 11 may be first fastened, or the shielding can 14 and the connecting terminal 11 may be fastened after processing of the cable connector 1 is completed. In this way, in a process of moving downward the cable connector 1 from the direction directly above the fastened wall 3, when the shielding can 14 and the fastened wall 3 are snap-fitted, the connecting terminal 11 is fastened to the fastened wall 3. In this way, automatic assembly can be implemented without pressing the connecting terminal 11, to improve assembly efficiency. The first contact 12 in the cable connector 1 and the second contact 22 on the printed circuit board 2 are in close contact through snap-fitting of the shielding can 14 and the fastened wall 3.

Solution 3: The connecting terminal 11 and the fastened wall 3 are snap-fitted, and the shielding can 14 and the fastened wall 3 are snap-fitted. In this solution, there is a snap-fitting relationship between the shielding can 14 and the fastened wall 3, and therefore the shielding can 14 and the connecting terminal 11 may not be fastened, or certainly there may be a fastening relationship. In this way, during assembly, the connecting terminal 11 is first moved downward from the direction directly above the fastened wall 3 to the direction close to the substrate 21, and when the connecting terminal 11 is moved downward to the fastened wall 3, snap-fitting of the connecting terminal 11 and the fastened wall 3 may be completed. Then, the shielding can 14 is moved downward from a direction directly above the connecting terminal 11 to a direction close to the connecting terminal 11 and moved downward until the shielding can 14 and the fastened wall 3 are snap-fitted. The first contact 12 in the cable connector 1 and the second contact 22 on the printed circuit board 2 are in close contact through snap-fitting of the connecting terminal 11 and the fastened wall 3 and snap-fitting of the shielding can 14 and the fastened wall 3.

In any one of the foregoing solutions, automatic assembly of the cable connector 1 and the printed circuit board 2 is implemented, to improve assembly efficiency, and screw-free assembly can be implemented.

As described above, when two components need to be electrically connected by using the electrical connection apparatus, the cable connector 1 and the printed circuit board 2 may be fitted for implementation. When two components do not need to be electrically connected by using the electrical connection apparatus, the cable connector 1 and the printed circuit board 2 may not be fitted.

Figure 12:
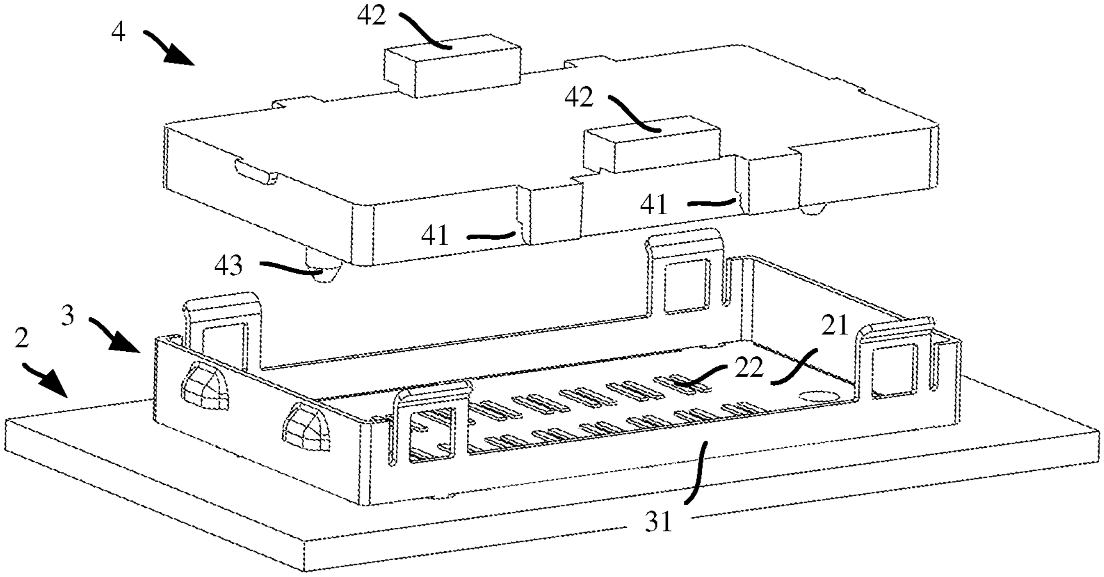
FIG. 12 is a schematic diagram of an explosive structure of an electrical connection apparatus according to this application.

When the cable connector 1 and the printed circuit board 2 are not fitted, to reduce dust on the second contact 22 on the printed circuit board 2, correspondingly, as shown in FIG. 12, the electrical connection apparatus further includes a dustproof cover 4, and the dustproof cover 4 matches the annular space 30. When the cable connector 1 and the printed circuit board 2 are not fitted, the dustproof cover 4 is located in the annular space 30, to cover the plurality of second contacts 22 in a direction far away from the substrate 21.

In an example, the dustproof cover 4 and the fastened wall 3 are connected in a detachable fastening manner. For example, the dustproof cover 4 and the fastened wall 3 may be connected through snap-fitting. For another example, the dustproof cover 4 and the fastened wall 3 may be connected through clamping.

Figure 13:
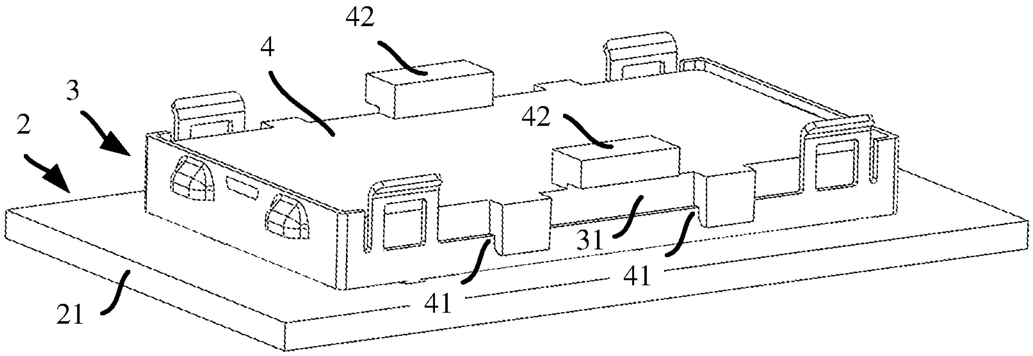
FIG. 13 is a schematic diagram of a structure of an electrical connection apparatus according to this application.

In an example, as shown in FIG. 11, there is a clamping groove 41 on a side part of the dustproof cover 4. When the cable connector 1 and the printed circuit board 2 are not fitted, the clamping groove 41 and the sidewall 31 are clamped. That is, as shown in FIG. 12 and with reference to FIG. 13, the dustproof cover 4 may be moved downward from a direction directly above the annular space 30 until the clamping groove 41 is clamped on the sidewall 31, to implement clamping of the dustproof cover 4 and the fastened wall 3.

The dustproof cover 4 covers the printed circuit board 2. To prevent the dustproof cover 4 from wearing the second contact 22 on the substrate 21, correspondingly, when the clamping groove 41 and the sidewall 31 are clamped, there is a gap between the dustproof cover 4 and the second contact 22. In this way, although the dustproof cover 4 covers the second contact 22, the dustproof cover 4 is not in contact with the second contact 22. Therefore, the dustproof cover 4 can be prevented from wearing the second contact 22.

A groove depth of the clamping groove 41 may be set, so that when the clamping groove 41 is completely clamped on the sidewall 31, there is a gap between the dustproof cover 4 and the second contact 22, and the dustproof cover 4 and the second contact 22 are not in contact.

In an example, the clamping groove 41 may be formed in the following manner: As shown in FIG. 12, there is an L-shaped protrusion on the side part of the dustproof cover 4. A horizontal part of the L-shaped protrusion is fastened to the side part of the dustproof cover 4. A spacing between a vertical part of the L-shaped protrusion and the side part of the dustproof cover 4 matches the thickness of the sidewall 31 of the fastened wall 3. For example, the spacing between the vertical part of the L-shaped protrusion and the side part of the dustproof cover 4 is greater than the thickness of the sidewall 31 of the fastened wall 3. In this way, the clamping groove 41 may be formed on the side part of the dustproof cover 4. The groove depth of the clamping groove 41 is a length of the vertical part of the L-shaped protrusion.

In this way, when the cable connector 1 and the printed circuit board 2 need to be fitted, the dustproof cover 4 may be removed, and the cable connector 1 may be detachably fastened to the fastened wall 3. When the cable connector 1 and the printed circuit board 2 do not need to be fitted, the dustproof cover 4 may be detachably fastened to the fastened wall 3.

To facilitate assembly and detachment of the dustproof cover 4, correspondingly, as shown in FIG. 12, there may be a handle structure 42 on a top of the dustproof cover 4. The dustproof cover 4 may be more conveniently assembled and detached by holding the handle structure 42. There may be one or more handle structures 42. For example, there may be one handle structure 42, and the handle structure 42 may be located at a central position of the top of the dustproof cover 4. For another example, there are two handle structures 42, and the two handle structures 42 are opposite to each other. The handle structure 42 may be an L-shaped protrusion, and a vertical part of the handle structure 42, namely, the L-shaped protrusion, is fastened to the top of the dustproof cover 4.

In an example, to improve efficiency of assembling the dustproof cover 4 to the fastened wall 3, correspondingly, as shown in FIG. 12, there are a plurality of third positioning rods 43 at a bottom of the dustproof cover 4, and there may be a plurality of third positioning holes on the substrate 21. The third positioning rod 43 and the third positioning hole fit with each other. Alternatively, the third positioning rod 43 fits with the first positioning hole 211. The first positioning hole 211 is a positioning hole that fits with the first positioning rod 112 at the bottom of the connecting terminal 11 when the connecting terminal 11 is assembled. In other words, the first positioning rod 112 at the bottom of the connecting terminal 11 and the third positioning rod 43 of the dustproof cover 4 share the first positioning hole 211 on the substrate 21.

In the example of this application, the fastened wall used to tightly press the connecting terminal in the cable connector onto the printed circuit board includes the plurality of sidewalls, and has a simple structure. During assembly of the cable connector and the printed circuit board, the connecting terminal in the cable connector is moved downward from the direction directly above the fastened wall to the direction close to the printed circuit board, and when the connecting terminal is moved downward to the fastened wall, the cable connector and the fastened wall are fastened in the detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

An embodiment of this application further provides a method for manufacturing an electrical connection apparatus. The method is used to process the foregoing electrical connection apparatus. The method may be performed based on the following steps.

In a process of processing a cable connector 1 that includes a connecting terminal 11 and a plurality of first contacts 12, the plurality of first contacts 12 may be fastened to the connecting terminal 11, where one part of each first contact 12 extends from the connecting terminal 11, to obtain the cable connector 1.

The cable connector 1 may further include a plurality of cables 13. In this case, one end of each of the plurality of cables 13 may be welded to the connecting terminal 11 and electrically connected to the first contact 12, and the other end of each of the plurality of cables 13 extends from the connecting terminal 11.

In a process of processing a printed circuit board 2 that includes a substrate 21 and a plurality of second contacts 22, the plurality of second contacts 22 may be fastened to a surface of the substrate 21, to obtain the printed circuit board 2.

For example, the plurality of second contacts 22 may be processed on the surface of the substrate 21 during circuit printing. For another example, the plurality of second contacts 22 may be processed on the surface of the substrate 21 after circuit printing is completed.

If a fastened wall 3 is of the structure shown in FIG. 2, in a process of processing the fastened wall 3, a plurality of sidewalls 31 may be head-to-tail connected, to form annular space 30 used to accommodate the connecting terminal 11, so as to obtain the fastened wall 3.

Processes of processing the cable connector 1, the printed circuit board 2, and the fastened wall 3 are not performed in a sequence, and may be simultaneously and concurrently performed. After each component is processed, assembly may be performed. An assembly process is described below.

The plurality of sidewalls 31 may be first fastened to the substrate 21. The plurality of sidewalls 31 are located on at least two opposite sides of the plurality of second contacts 22. For specific details, refer to the foregoing description. Details are not described herein.

If the plurality of sidewalls 31 of the fastened wall 3 are distributed on all sides of the second contacts 22, the plurality of sidewalls 31 may be fastened to the substrate 21 and surround the plurality of second contacts 22, as shown in FIG. 2.

After the fastened wall 3 is fastened to the printed circuit board 2, when the cable connector 1 and the printed circuit board 2 need to be electrically connected, in other words, when the cable connector 1 and the printed circuit board 2 are fitted, the connecting terminal 11 may be placed in the fastened wall 3, and the cable connector 1 and the fastened wall 3 are fastened in a detachable manner. The first contact 12 and the second contact 22 are in close contact.

The fastened wall of the processed electrical connection apparatus is used to press the connecting terminal in the cable connector onto the printed circuit board, includes the plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in the detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

In an example, the cable connector 1 and the printed circuit board 2 may be detachably fastened through snap-fitting cable connector, for example, snap-fitting of the connecting terminal 11 and the fastened wall 3. When there is a snap-fitting relationship between the connecting terminal 11 and the fastened wall 3, the fastened wall 3 includes the plurality of sidewalls 31, and may further include a plurality of elastic plates 32. In this case, the process of processing the fastened wall 3 may include connecting each of the plurality of elastic plates 32 to the sidewall 31.

The elastic plate 32 can rotate around a connection point relative to the connected sidewall 31, and is configured to enable the connecting terminal 11 and the fastened wall 3 to be snap-fitted.

In an example, if the fastened wall 3 is of the structure shown in FIG. 2, the process of processing the fastened wall 3 may be as follows: The plurality of sidewalls 31 may be first head-to-tail connected, to form the annular space 30 used to accommodate the connecting terminal 11; and then each of the plurality of elastic plates 32 is connected to the sidewall 31, to obtain the fastened wall 3. Alternatively, the elastic plate 32 and the sidewall 31 may be first connected; and then the plurality of sidewalls 31 connected to the elastic plate 32 are head-to-tail connected, to form the annular space 30 used to accommodate the connecting terminal 11.

For a manner of connecting the elastic plate 32 and the sidewall 31, a quantity of elastic plates 32, and distribution of the elastic plates 32, refer to the foregoing description. Details are not described herein.

In an example, there are a plurality of manners of snap-fitting the connecting terminal 11 and the fastened wall 3 by using the elastic plate 32. A manner may be as follows: First, a first end of each of the plurality of elastic plates 32 in a height direction is connected to the sidewall 31. A second end of each elastic plate 32 is far away from the connected sidewall 31. Each elastic plate 32 is provided with a first positioning hole 321, and there are a plurality of first positioning protrusions 111 on a side surface 11*a* of the connecting terminal 11. Then, the connecting terminal 11 is placed in the fastened wall 3, so that the first positioning protrusion 111 is located in the first positioning hole 321. In this manner, the connecting terminal 11 is snap-fitted into the fastened wall 3 through fitting of the protrusion and the positioning hole.

Another manner may be as follows: Each elastic plate 32 includes a parent body 322 and a folding body 323 formed through folding. First, the parent body 322 of each elastic plate 32 may be connected to the sidewall 31. The folding body 323 is located in a frame of the fastened wall 3. Then, the connecting terminal 11 may be placed in the fastened wall 3, so that the folding body 323 of each elastic plate 32 is pressed onto an upper surface that is of the connecting terminal 11 and that is far away from the substrate 21.

In an example, the elastic plate 32 may be first folded to form the elastic plate 32 including the parent body 322 and the folding body 323, and then the elastic plate 32 including the parent body 322 and the folding body 323 is connected to the sidewall 31.

In another example, the elastic plate 32 may be first connected to the sidewall 31, and then the elastic plate 32 is folded towards the frame of the fastened wall 3, to form the elastic plate 32 including the parent body 322 and the folding body 323.

For the elastic plate 32 including the parent body 322 and the folding body 323, the folding body 323 is pressed onto the upper surface of the connecting terminal 11, so that the connecting terminal 11 is snap-fitted into the fastened wall 3.

In an example, the cable connector 1 may further include a shielding can 14, to reduce interference caused by a surrounding component to a signal transmitted in the electrical connection apparatus and to reduce interference caused by the signal transmitted in the electrical connection apparatus to another component. Correspondingly, the method may further include: covering a surface that is of the connecting terminal 11 and that is far away from the substrate 21 with the shielding can 14, and snap-fitting the shielding can 14 and the fastened wall 3.

A process of covering the connecting terminal 11 with the shielding can 14 may be performed before the connecting terminal 11 is mounted into the fastened wall 3 or after the connecting terminal 11 is mounted into the fastened wall 3.

In an example, when the cable connector 1 and the printed circuit board 2 do not need to be electrically connected, in other words, when the cable connector 1 and the printed circuit board 2 are not fitted, to reduce dust accumulation on the second contact 22 on the printed circuit board 2, correspondingly, the electrical connection apparatus may further include a dustproof cover 4. Correspondingly, the method may further include: when the cable connector 1 and the printed circuit board 2 are not fitted, covering the plurality of second contacts 22 with the dustproof cover 4 in a direction far away from the substrate 21.

The dustproof cover 4 may be detachably fastened to the fastened wall 3, or may be detachably fastened to the substrate 21.

For example, there is a clamping groove 41 on a side part of the dustproof cover 4. In this case, the dustproof cover 4 may be placed in the fastened wall 3, and the clamping groove 41 may be clamped on the sidewall 31, so that the dustproof cover 4 is detachably fastened to the fastened wall 3.

To prevent the dustproof cover 4 from wearing the second contact 22, when the dustproof cover 4 is clamped with the sidewall 31 of the fastened wall 3 through the clamping groove 41, there is a gap between the dustproof cover 4 and the second contact 22. In this way, the dustproof cover 4 and the second contact 22 are not in contact, to effectively prevent the dustproof cover 4 from wearing the second contact 22.

It may be learned that the clamping groove 41 of the dustproof cover 4 and the sidewall 31 of the fastened wall 3 are clamped. In this way, the dustproof cover 4 and the fastened wall 3 can be detachably fastened. In addition, there can be a gap between the dustproof cover 4 and the second contact 22, and the dustproof cover 4 and the second contact 22 are not in contact with each other, to prevent the dustproof cover 4 from wearing the second contact 22 and protect the second contact 22.

The fastened wall of the electrical connection apparatus processed by using this method is used to tightly press the connecting terminal in the cable connector onto the printed circuit board, includes the plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in the detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

An embodiment of this application further provides a computer device. The computer device may be any device that includes components that are in an electrical connection relationship. For example, the computer device may be a communications device such as a router and a switch.

The computer device may include the foregoing electrical connection apparatus. One or more electrical connection apparatuses may be included. For example, in a solution in which there are a plurality of electrical connection apparatuses, printed circuit boards of the plurality of electrical connection apparatuses may be a same printed circuit board, and may be specifically a mainboard of the computer device. In this case, the mainboard may include a plurality of groups of second contacts, and each group of second contacts includes a plurality of second contacts. Each group of second contacts corresponds to one cable connector. For another example, in a solution in which there are a plurality of electrical connection apparatuses, printed circuit boards of the plurality of electrical connection apparatuses may not be a same printed circuit board.

In application, two same components in the computer device may be electrically connected by using the electrical connection apparatus, or two different components in the computer device may be electrically connected by using the electrical connection apparatus.

A fastened wall of the electrical connection apparatus included in the computer device is used to press a connecting terminal in a cable connector onto a printed circuit board, includes a plurality of sidewalls, and has a simple structure. During assembly of the cable connector and the printed circuit board, the connecting terminal in the cable connector is moved downward from a direction directly above the fastened wall to a direction close to the printed circuit board, and when the connecting terminal is moved downward to the fastened wall, the cable connector and the fastened wall are fastened in a detachable manner. It may be learned that during assembly of the cable connector and the printed circuit board, an operation is always performed in a direction that is directly above the fastened wall and that is far away from the printed circuit board, and space, on the printed circuit board, around the fastened wall is not affected. Therefore, the fastened wall that serves a fastener for tightly pressing the cable connector onto the printed circuit board occupies relatively small space on the printed circuit board, and space on the printed circuit board can be saved. In addition, another component may be further arranged in the space, on the printed circuit board, around the fastened wall, so that a relatively large quantity of components may be mounted on the printed circuit board, to facilitate high-density development.

The foregoing descriptions are merely an embodiment of this application, but are not intended to limit this application. Any modification, equivalent replacement, improvement, or the like made without departing from the principle of this application should fall within the protection scope of this application.

What is claimed is:

1. An apparatus, comprising:

a cable connector, comprising a connecting terminal and a plurality of first contacts, wherein a part of each first contact of the plurality of first contacts is located in the connecting terminal, and another part of each first contact extends from the connecting terminal;

a printed circuit board, comprising a substrate and a plurality of second contacts, wherein the plurality of second contacts are located on a surface of the substrate; and a fastened wall comprising a plurality of sidewalls, wherein the plurality of sidewalls are fastened to the substrate and are located on at least two opposite sides of the plurality of second contacts, and the cable connector and the fastened wall are configured in a manner that, when the cable connector and the printed circuit board are fitted, the cable connector and the fastened wall are detachably fastened, and the plurality of first contacts and the plurality of second contacts are in close contact, wherein the fastened wall further comprises a plurality of elastic plates, each elastic plate of the plurality of elastic plates is connected to a sidewall of the plurality of sidewalls, and for each elastic plate of the plurality of elastic plates, a first end of the respective elastic plate in a height direction is connected to the sidewall to which the respective elastic plate is connected, and a second end of the respective elastic plate is farther away from the printed circuit board than an edge of the sidewall to which the respective elastic plate is connected that is farthest from the printed circuit board.

2. The apparatus according to claim 1, wherein the plurality of sidewalls surrounds the plurality of second contacts, and the connecting terminal is located in an annular space enclosed by the plurality of sidewalls.

3. The apparatus according to claim 2, wherein the plurality of sidewalls are head-to-tail connected to form the annular space.

4. The apparatus according to claim 3, wherein each elastic plate is rotatable around a connection point relative to the sidewall to which the respective elastic plate is connected; and wherein the plurality of elastic plates is configured to enable the connecting terminal and the fastened wall to be snap-fitted.

5. The apparatus according to claim 4, wherein a first positioning hole extends in each elastic plate of the plurality of elastic plates, a plurality of first positioning protrusions are on side surfaces of the connecting terminal, and a first positioning protrusion of the plurality of first positioning protrusions is located in each first positioning hole of the plurality of elastic plates.

6. The apparatus according to claim 5, wherein the second end that is of each elastic plate and that is away from the connected sidewall connected to the corresponding elastic plate is bent out of a frame of the fastened wall.

7. The apparatus according to claim 5, wherein an end face of each first positioning protrusion that is away from the side surface on which the respective first positioning protrusion is located comprises an inclined surface, an intersection line between a plane on which the respective inclined surface is located and the corresponding side surface is located below the first positioning protrusion, and there is a direction close to the printed circuit board below the first positioning protrusion.

8. The apparatus according to claim 4, wherein each elastic plate comprises a parent body and a folding body, and the parent body of each elastic plate is connected to the sidewall to which the respective elastic plate is connected; and wherein the folding body of each elastic plate is located on an upper surface of the connecting terminal that is away from the substrate.

9. The apparatus according to claim 8, wherein a plurality of first positioning rods are at a bottom of the connecting terminal, a plurality of first positioning holes extend in the substrate, and each first positioning rod of the plurality of first positioning rods is located in a first positioning hole of the plurality of first positioning holes.

10. The apparatus according to claim 9, wherein the cable connector further comprises a shielding can, the shielding can is located on a surface that is of the connecting terminal and that is away from the substrate, and the shielding can is snap-fitted with the fastened wall.

11. The apparatus according to claim 10, wherein a second positioning hole extends in the shielding can, a second positioning protrusion is on a sidewall of the plurality of sidewalls, and the second positioning protrusion is located in the second positioning hole.

12. The apparatus according to claim 11, wherein the shielding can and the connecting terminal are fastened together.

13. The apparatus according to claim 12, further comprising:

a dustproof cover, configured to:

when the cable connector and the printed circuit board are not fitted, the dustproof cover covers the plurality of second contacts in a direction away from the substrate.

14. The apparatus according to claim 13, wherein a clamping groove extends in a side part of the dustproof cover, the clamping groove and the sidewall on which the second positioning protrusion is disposed are clamped, and a gap is between the dustproof cover and the plurality of second contacts.

15. A method, comprising:

fastening a plurality of first contacts to a connecting terminal, wherein a part of each first contact of the plurality of first contacts extends from the connecting terminal, to obtain a cable connector;

fastening a plurality of second contacts to a surface of a substrate, to obtain a printed circuit board;

fastening a plurality of sidewalls of a fastened wall to the substrate, wherein the plurality of sidewalls are located on at least two opposite sides of the plurality of second contacts; and connecting each of a plurality of elastic plates to a sidewall of the plurality of sidewalls, wherein when the cable connector and the printed circuit board are fitted, the cable connector and the fastened wall are detachably fastened and the first contact and the second contact are in close contact, and wherein for each elastic plate of the plurality of elastic plates, a first end of the respective elastic plate in a height direction is connected to the sidewall to which the respective elastic plate is connected, and a second end of the respective elastic plate is farther away from the printed circuit board than an edge of the sidewall to which the respective elastic plate is connected that is farthest from the printed circuit board.

16. The method according to claim 15, wherein each elastic plate is rotatable around a connection point relative to the sidewall to which the respective elastic plate is connected, and the plurality of elastic plates is configured to enable the connecting terminal and the fastened wall to be snap-fitted.

17. The method according to claim 16, wherein a first positioning hole extends in each elastic plate, and a plurality of first positioning protrusions are on side surfaces of the connecting terminal; and fastening the cable connector and the fastened wall in the detachable manner comprises:

mounting the first positioning protrusion in the first positioning hole.

18. The method according to claim 16, wherein each elastic plate of the plurality of elastic plates comprises a parent body and a folding body;

wherein connecting each of the plurality of elastic plates to the sidewall to which the respective elastic plate is connected comprises:

connecting the parent body of each elastic plate to the sidewall to which the respective elastic plate is connected; and wherein fastening the cable connector and the fastened wall in the detachable manner comprises:

pressing the folding body of each elastic plate onto an upper surface that is of the connecting terminal and that is away from the substrate.

19. The method according to claim 18, wherein the cable connector further comprises a shielding can, and the method further comprises:

covering a surface of the connecting terminal that is away from the substrate with the shielding can, and snap-fitting the shielding can and the fastened wall.

20. The method according to claim 19, further comprising:

when the cable connector and the printed circuit board are not fitted, covering the plurality of second contacts with a dustproof cover in a direction away from the substrate.

* * * * *